US006718142B1

United States Patent
Murai

(10) Patent No.: US 6,718,142 B1
(45) Date of Patent: Apr. 6, 2004

(54) OPTICAL SIGNAL GENERATING CIRCUIT AND OPTICAL TRANSMISSION LINE

(75) Inventor: Hitoshi Murai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/556,433

(22) Filed: Apr. 24, 2000

(30) Foreign Application Priority Data

Sep. 9, 1999 (JP) .......................................... 11-255868
Nov. 9, 1999 (JP) .......................................... 11-318147

(51) Int. Cl.[7] .......................... H04B 10/04; H04B 10/12
(52) U.S. Cl. ........................ 398/183; 398/201; 398/155
(58) Field of Search ................................ 398/102, 155, 398/161, 181–183, 186, 201

(56) References Cited

U.S. PATENT DOCUMENTS 5,457,559 A * 10/1995 Saito et al. .................... 398/98
6,532,091 B1 * 3/2003 Miyazaki et al. ........... 398/175

OTHER PUBLICATIONS

K. Yoneyama et al., All–optical clock recovery from NRZ data signal using Mach–Zehnder interferometer with different path length, 1988, p. 608.

F. Favre et al., 4×20 Gbit/s soliton WDM transmission over 2000km with 100km dispersion–compensated spans of standard fibre, Jul. 3, 1997, pp. 1234–1235.

* cited by examiner

Primary Examiner—Kinfe-Michael Negash
(74) Attorney, Agent, or Firm—Wenderoth, Lind & Ponack, L.L.P.

(57) ABSTRACT

An optical transmission line allows optical signals to be transmitted with higher stability over longer distances. According to a first aspect, an optical NRZ signal is split in two, one half is presented to a clock extraction circuit, and the other half is presented to an EA modulator. An optical RZ signal is obtained as an output because the EA modulator is energized by the provided clock component. According to a second aspect, a nonlinear phase shift based on cross-phase modulation is induced in an RZ pulse train by an optical NRZ signal, and only the RZ pulses corresponding to the optical NRZ signal are extracted. According to a third aspect, first dispersion compensator is provided to a preceding stage of an optical fiber transmission line for transmitting optical pulses, and second dispersion compensation compensator is provided to a subsequent stage. Pulse widening in the optical fiber transmission line is controlled by a nonlinear chirp induced in the first dispersion compensator.

3 Claims, 20 Drawing Sheets

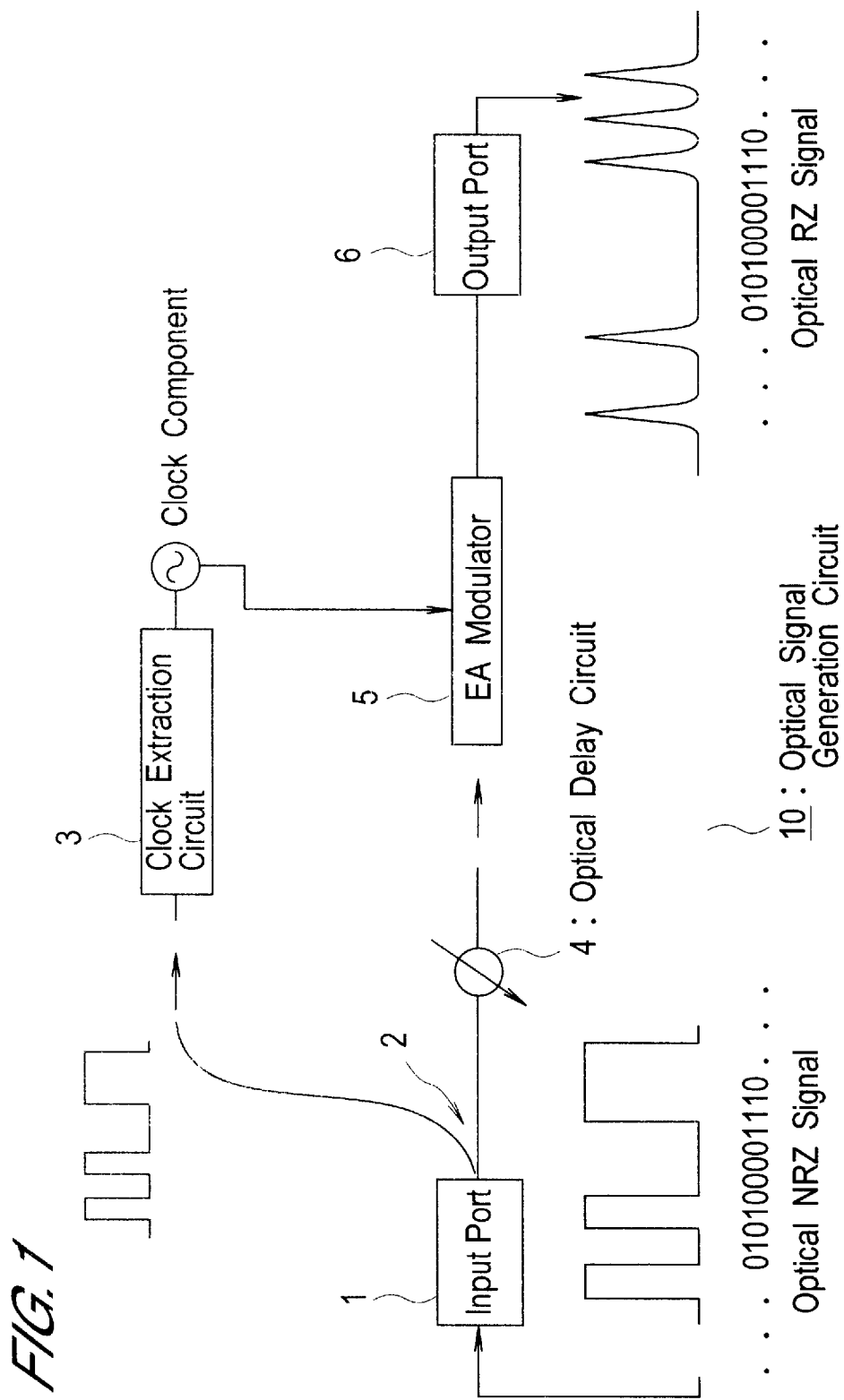

Clock Component

Inputted Optical NRZ Signal

Time

FIG. 12
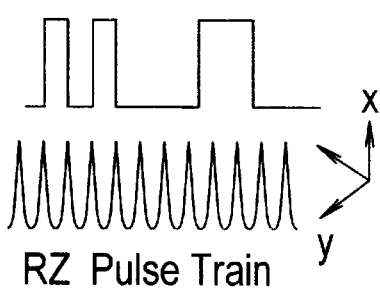
Optical NRZ Signal
RZ Pulse Train
50 : Optical Signal Generation Circuit
51 : Optical Fiber
53 : Polarization Beam Splitter
54
Receiver
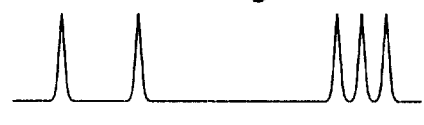
RZ Signal
Inverted RZ Signal

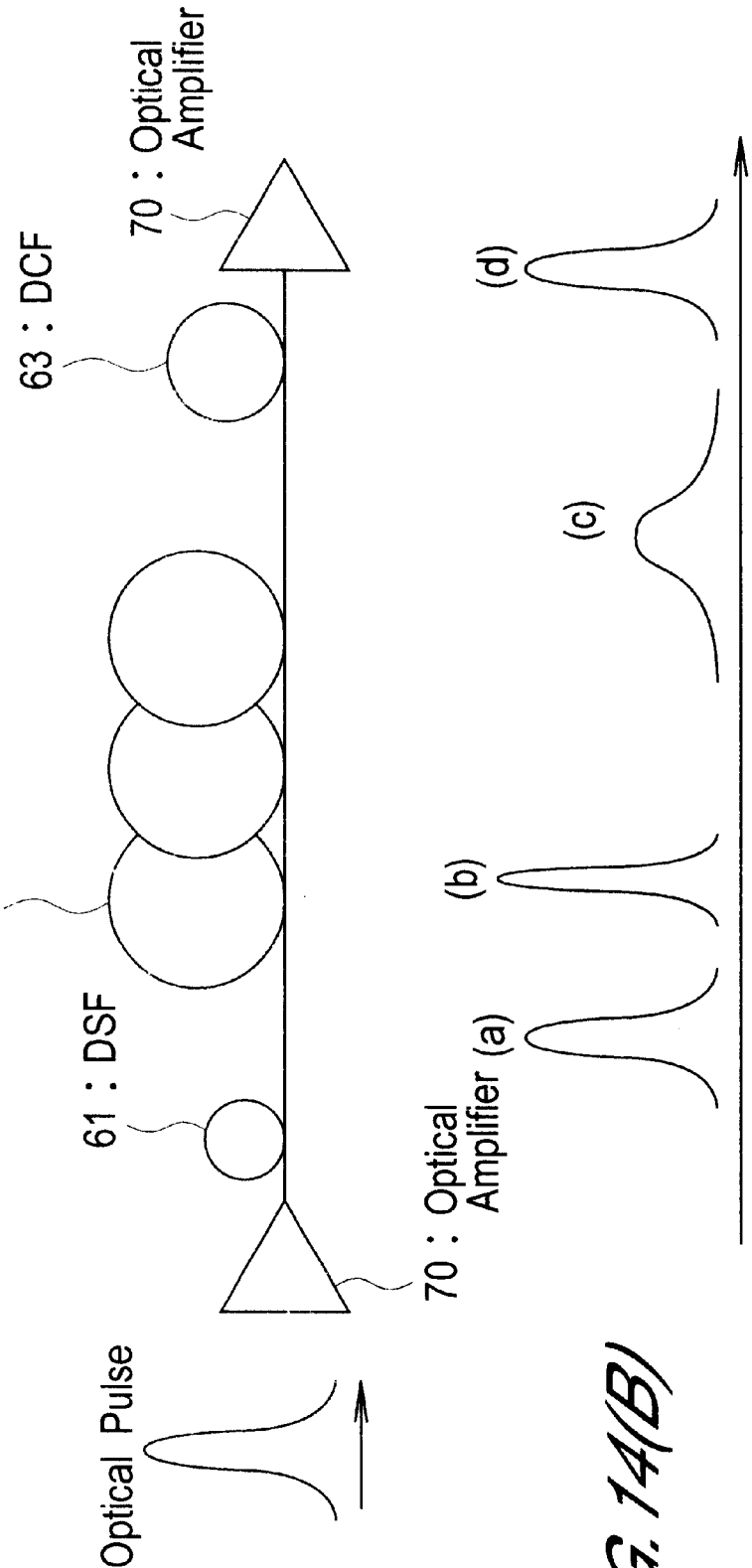

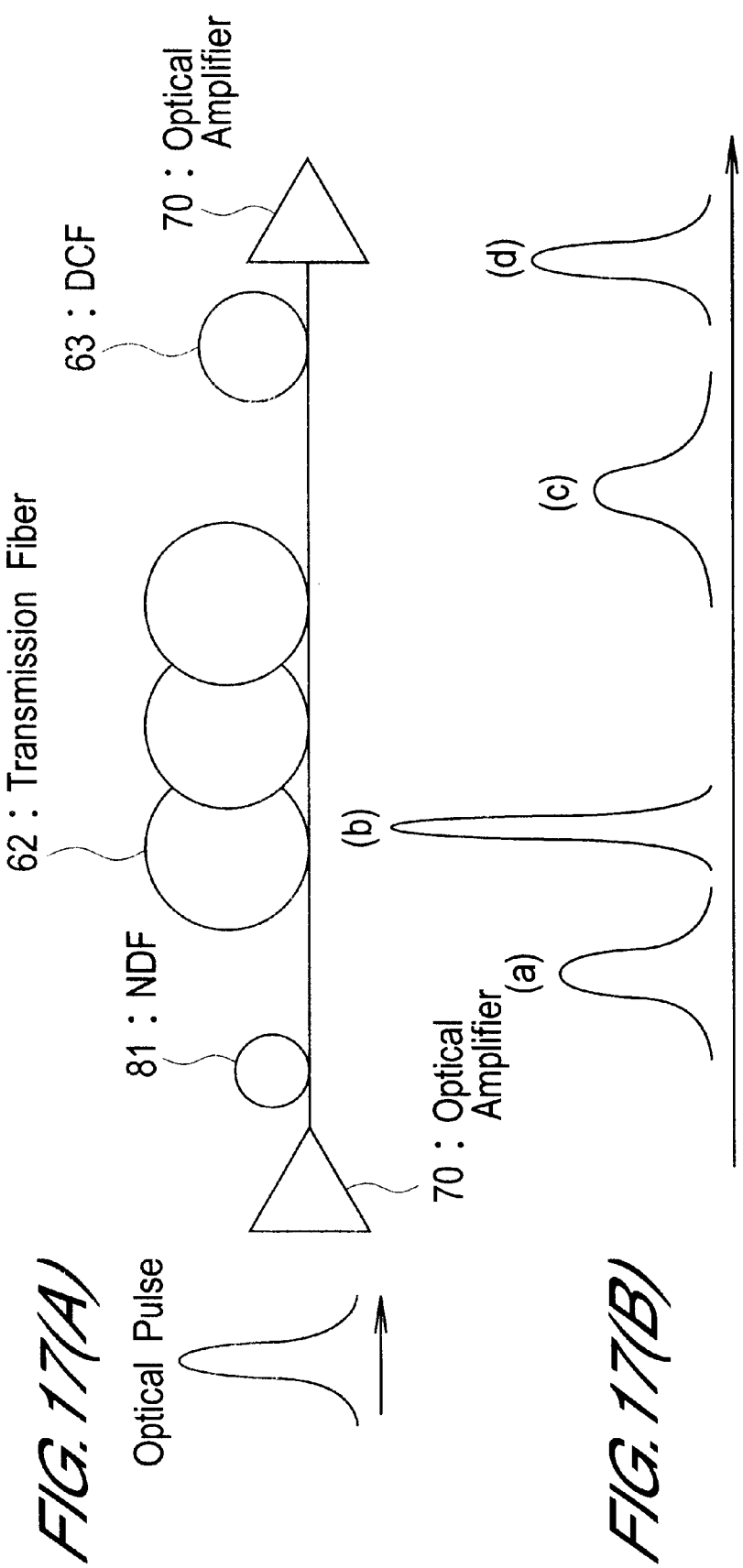

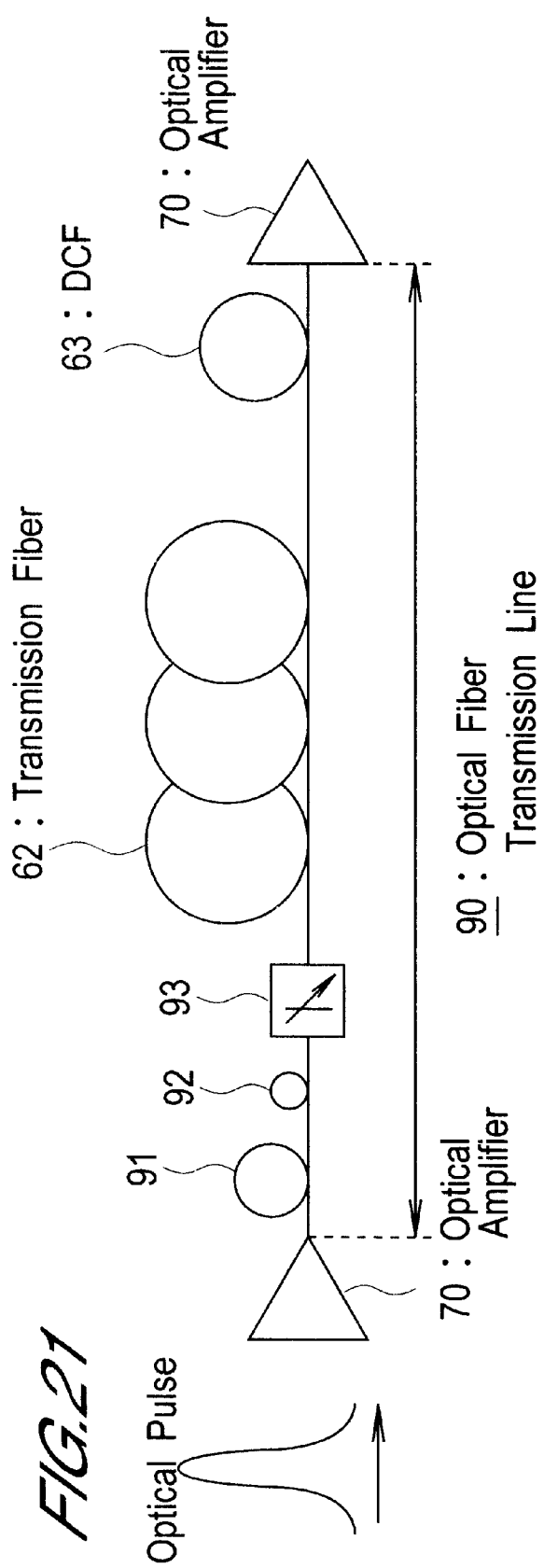

OPTICAL SIGNAL GENERATING CIRCUIT AND OPTICAL TRANSMISSION LINE

BACKGROUND OF THE INVENTION

1. Field of the Invention

The present invention relates to a total optical conversion circuit for converting NRZ signals to an RZ or soliton format. The present invention also relates to an optical transmission line suitable for transmitting the RZ or soliton signals thus converted. Specifically, this optical transmission line is an optical fiber transmission line in which signals can be transmitted over long distances by selecting an appropriate setting for the dispersion of the transmission lines constituting this optical fiber transmission line.

2. Description of Related Art

It is believed that total optical signal processing circuits will become indispensable for optical communications systems featuring optical fiber transmission lines. In the total optical signal processing circuits currently in the research stage, RZ signals are used as the optical signal format because of good correlation with optical time-division multiplexing. Total optical NRZ/RZ conversion technology is believed to be necessary for future ultra high-speed signal processing.

The following is a description of the general structure of a so-called transponder, which converts an NRZ signal to an RZ signal. As indicated, for example, by Yoneyama et al. in "All-optical clock recovery from NRZ data signal using Mach-Zehnder interferometer with different path length": 1998 Denshi Johotushin gakkai sogo taikai, Transmission 2, B-10-145 (Literature 1), an NRZ signal is inputted to a delay Mach-Zehnder interferometer and is split in two. The two halves travel along optical paths having mutually different lengths, and are then synthesized again. In the process, an optical signal representing the synthetic sum and an optical signal representing the difference resulting from the two halves canceling each other are outputted from two different output ports of the delay Mach-Zehnder interferometer. Of these signals, the optical signal representing the difference contains the clock component of the inputted optical signal, so this signal is inputted to a mode-locked laser diode whose locking range has the same frequency band, and the RZ clock component is extracted by subjecting this laser to optical injection locking.

In this case, however, only the RZ clock component of the optical signal is extracted, and there is no reproduction of the digital pattern contained in the NRZ optical signal. In addition, a mode-locked laser diode (MLLD) is used in Literature 1 above, but the repetition frequency (frequency locking range) of an MLLD is substantially determined by the resonator length of the laser. With current MLLDs, the desired resonator length is obtained by the cleavage of semiconductor chips, so a mode-locked laser diode suitable for the operating frequency of the system is more difficult to obtain than a regular laser element.

The following is a description of an optical fiber transmission line for transmitting an RZ signal or soliton signal thus generated.

Optical transmission lines used in conventional practice are obtained by connecting, for example, transmission fibers to dispersion-compensated fibers or other components whose wavelength dispersion is opposite in sign to the wavelength dispersion of the transmission fibers. For example, the method disclosed in "4×20 Gbit/s soliton WDM transmission over 2000 km With 100 km dispersion-compensated spans of standard fiber": *Electronics Letters* Vol. 33, No. 14, pp. 1234–1235, Jul. 3, 1997 (Literature 2) is known as a method for stabilizing so-called dispersion-managed solitons propagating along such optical transmission lines. Literature 2 discloses so-called pre-chirp, a technique in which a short optical pulse is provided with a chirp before this pulse is introduced into a transmission line.

In systems such as those described in Literature 2 above, however, optical pulses that are constantly up-chirped in linear fashion propagate toward the outlet of the transmission line. The width of the stable optical pulses at the outlet of the transmission line is therefore greater than the width of freshly formed pulses. Wide optical pulses are unsuitable for obtaining higher bit rates in optical transmission systems. In addition, the necessary amount of pre-chirp in the pre-chirp technique is determined by the properties of the dispersion-compensated fiber. Applying this method to optical wavelength-division multiplexing transmission causes the chirp amount to vary with the wavelength and makes it difficult to design a transmission line when the dispersion-compensated fiber has a dispersion slope.

A need therefore exists for a simply structured and highly reliable NRZ/RZ converter for converting optical NRZ signals to RZ signals or soliton signals. A need also exists for an optical transmission line through which optical pulses thus generated could propagate in a stable manner.

SUMMARY OF THE INVENTION

According to a first aspect of the present invention, an optical signal generation circuit is provided. In this optical signal generation circuit, an inputted optical NRZ signal is split in two by an optical coupler, and the first half is presented to a clock extraction circuit. The second half is presented to an EA modulator. The clock extraction circuit extracts the clock component from the optical NRZ signal and presents the result to the EA modulator. The EA modulator is energized by the clock component received, and thus generates an optical RZ signal as an output. In this case, a delay circuit should preferably be provided to the preceding stage of the EA modulator to adjust the timing. It is also preferable for the output of the EA modulator to be fed back to the delay circuit to control the delay amount.

The optical signal generation circuit according to a second aspect of the present invention has a first waveguide and a second waveguide. Parts of the two waveguides are placed close to each other, forming a coupled waveguide region. An optical NRZ signal and an RZ pulse train have the same wavelengths and are inputted to the first waveguide. At this point, a nonlinear phase shift based on cross-phase modulation is induced in the RZ pulse train by the optical NRZ signal in the coupled region. As a result, only the RZ pulses corresponding to the optical NRZ signal (from among the individual RZ pulses constituting the RZ pulse train) are outputted by the first waveguide.

At this time, an optical NRZ signal leaked out from the output terminal of the first waveguide can be removed if the optical NRZ signal and the RZ pulse train have different wavelengths and the output terminal of the first waveguide is provided with an optical band-pass filter. It is also possible to provide the output terminal of the second waveguide with a receiver to receive RZ pulses that do not correspond to the optical NRZ signal and to monitor the operation of the optical signal generation circuit.

The optical signal generation circuit according to a third aspect of the present invention has a Y-branch light waveguide. The primary mode and first mode of signal light propagate through this Y-branch light waveguide. Thus, signal light appears only in one of these Y-branches due to the interference between these two modes if the length from the input point of signal light to the Y-branch point is appropriately set. The Y-branch light waveguide receives an optical NRZ signal having a prescribed wavelength, and an RZ pulse train whose wavelength is different from this prescribed wavelength At this point, a nonlinear phase shift based on cross-phase modulation is induced in the RZ pulse train by the optical NRZ signal in the Y-branch light waveguide. As a result, only the RZ pulses corresponding to the optical NRZ signal (from among the individual RZ pulses constituting the RZ pulse train) appear in one of the Y-branches. The RZ pulses that do not correspond to the optical NRZ signal appear in the other Y-branch. In this embodiment as well, it is beneficial to provide the output portion with an optical bandpass filter or a receiver for receiving the RZ pulses that do not correspond to the optical NRZ signal.

The optical signal generation circuit according to a fourth aspect of the present invention has a light waveguide and a polarizer connected to this light waveguide. The light waveguide is presented with an optical NRZ signal having a first polarization direction and an RZ pulse train having a second polarization direction, which differs by 45° from the first polarization direction. As a result, a nonlinear phase shift based on cross-phase modulation is induced in the RZ pulse train by the optical NRZ signal in the light waveguide. As a result, the polarization plane at the outgoing end of an optical fiber 51 for the RZ pulse train can be shifted relative to the initial polarization plane. The RZ pulse train is therefore inputted to the polarizer, and only the RZ pulses corresponding to the optical NRZ signal are extracted.

The optical transmission line according to a fifth embodiment of the present invention has first and second dispersion compensation means, which are provided to the preceding and subsequent stages, respectively, of an optical fiber transmission line for transmitting optical pulses. Here, the dispersion value of the first dispersion compensation means is set substantially to near-zero level or to a normal dispersion level. The dispersion value of the second dispersion compensation means is negative. Pulse widening in the optical fiber transmission line is therefore controlled by the nonlinear chirp induced in the first dispersion compensation means.

BRIEF DESCRIPTION OF THE DRAWINGS

The foregoing and other objects, features and advantages of the present invention will be better understood from the following description taken in connection with the following drawings, in which:

FIG. 1 is a block diagram depicting an optical signal generation circuit according to a first embodiment of the present invention;

FIG. 12 is a block diagram depicting a modified optical signal generation circuit according to the fourth embodiment of the present invention;

FIGS. 14(A) and (B) are a diagram depicting the condition of optical pulses in the optical transmission line according to the fifth embodiment of the present invention;

FIGS. 17(A) and (B) are a diagram depicting the condition of optical pulses in the optical transmission line according to the sixth embodiment of the present invention;

FIG. 21 is a diagram depicting an optical transmission line according to an eighth embodiment of the present invention.

DESCRIPTION OF THE PREFERRED EMBODIMENTS

Figure 2A:
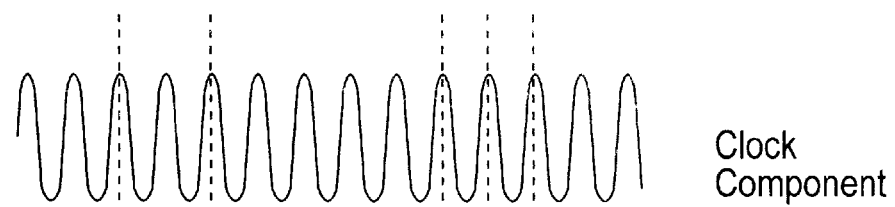
FIGS. 2(A) and (B) are a diagram depicting the relation between an optical NRZ signal and the extracted clock component in accordance with the present invention.

Embodiments of the present invention will now be described with reference to drawings. FIG. 1 is a block diagram depicting an optical signal generation circuit 10 according to a first embodiment of the present invention.

The optical signal generation circuit 10 of the first embodiment has an input port 1 for inputting an optical NRZ (non-return-to-zero) signal. The optical NRZ signal introduced through the input port 1 is subsequently presented to an optical coupler 2. The optical NRZ signal is split in two by the optical coupler 2. The first half is inputted to a clock extraction circuit 3 and the second have is inputted to an optical delay circuit 4.

The clock extraction circuit 3 extracts the clock component from the inputted optical NRZ signal. Although no description is given herein concerning the specific structure of the clock extraction circuit 3, this structure should be apparent to those skilled in the art. The clock extraction circuit 3 thus outputs a sine wave (clock component of the optical NRZ signal) as an electric signal. This clock component is presented to an EA (electro-absorptive) modulator 5. The EA modulator 5 is energized by this clock signal.

Timing is shifted due to the fact that one of the two branched optical NRZ signals produced by the above-described optical coupler 2 has a different optical path length from the other optical NRZ signal, the time being needed to perform the clock extraction procedure in the clock extraction circuit 3, that there is a delay in the sine wave retrieved as an electric signal from the clock extraction circuit 3, and the like. To compensate for this timing shift, the other optical NRZ signal branched by the optical coupler 2 is inputted to the optical delay circuit 4 to adjust the timing between the sine-wave signal inputted to the EA modulator 5 and the other optical NRZ signal.

Specifically, the optical delay circuit 4 adjusts the phase of the other branched optical NRZ signal and presents the result to the aforementioned EA modulator 5. The phase of the other branched optical NRZ signal is thereby adjusted to achieve agreement between the peak of the sine wave of the extracted clock component (FIG. 2(A)) and the pulse center of the optical NRZ signal (FIG. 2(B)) presented to the EA modulator 5, as shown in FIGS. 2(A) and (B). By establishing such a relation, it is possible to retain part of the other branched optical NRZ signal in the EA modulator 5.

As a result, an optical RZ (return-to-zero) signal is generated as the output of the EA modulator 5. Because, locally, the original optical NRZ signal is a continuous wave, the pulse waveform of the outputted optical RZ signal is a Gauss type or a $sech^2 t$ type in the same manner as when a continuous wave is inputted to an EA modulator energized by a sine wave. The optical RZ signal thus generated is outputted from an output port 6.

An optical NRZ signal can thus be converted to an optical RZ signal or a soliton signal, with the aid of a very simple structure. The optical RZ or soliton signal thus generated is amplified by an optical amplifier (not shown) to a prescribed level, and is then sent out to an optical transmission line.

Figure 3:
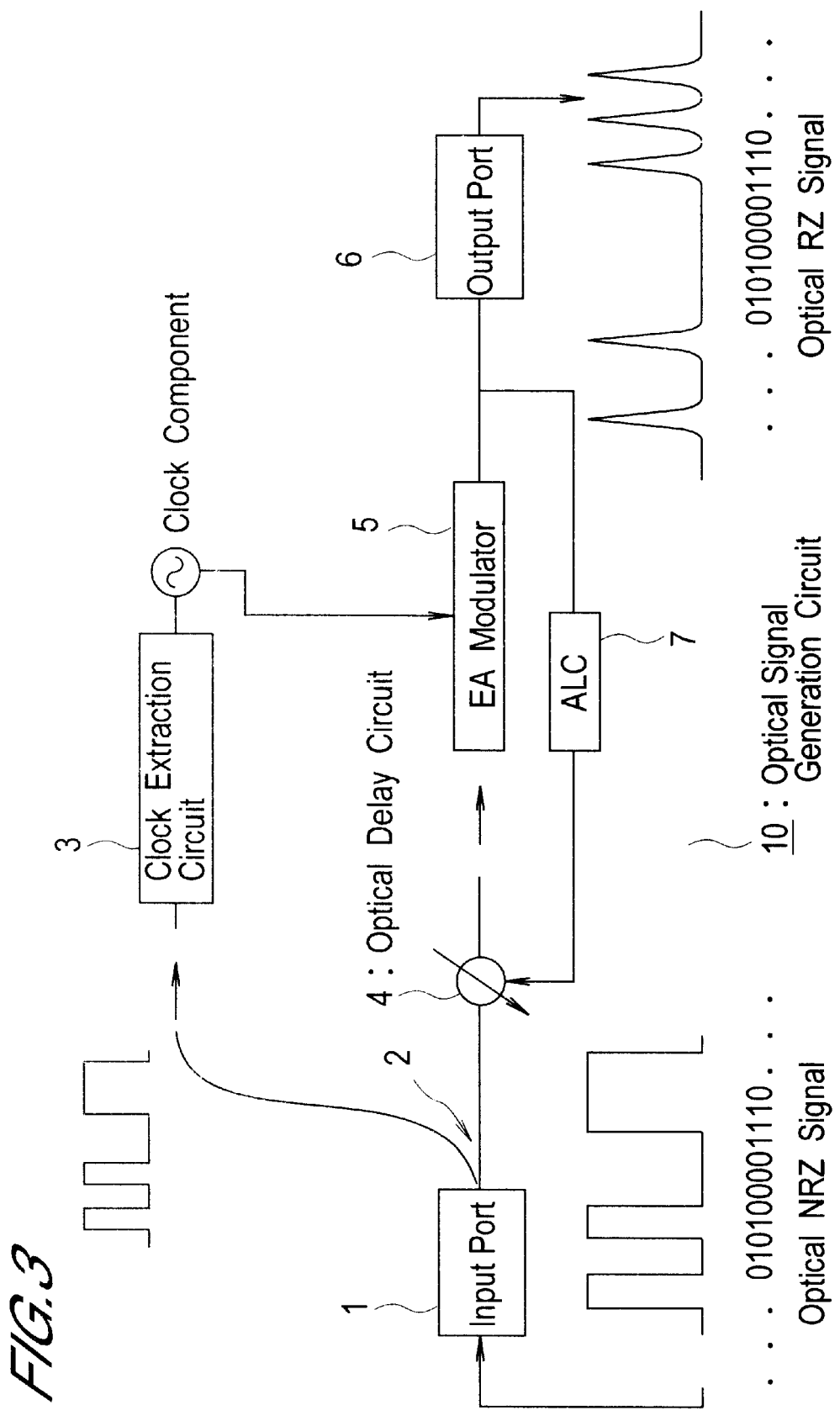
FIG. 3 is a block diagram depicting a modified optical signal generation circuit according to the first embodiment of the present invention.

FIG. 3 depicts a modified optical signal generation circuit according to the first embodiment. This modified example is configured such that an auto-level control (ALC) circuit 7 is added to the optical signal generation circuit depicted in FIG. 1.

The optical signal generation circuit depicted in FIG. 1 is such that the second of the two split optical NRZ signals obtained in the optical coupler 2 is delayed using the optical delay circuit 4. As a result, the relation shown in FIG. 2 is established between the optical NRZ signal inputted to the EA modulator 5 and the sine wave (reproduced clock component) for energizing the EA modulator. In actual practice, however, this timing relation can be shifted by variations in the outside temperature, application of flexural stress to the fiber, or the like.

Figure 2B:
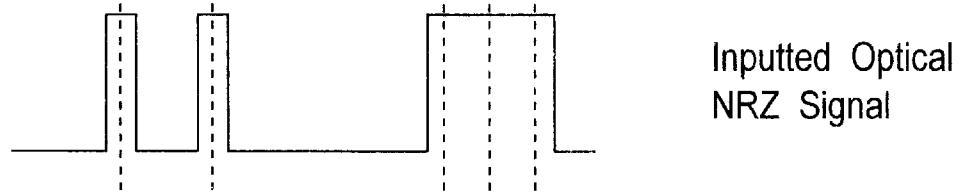

The optical output of the EA modulator 5 should always be at a maximum as long as the optical intensity inputted to the EA modulator 5 remains constant and the relation depicted in FIGS. 2(A) and 2(B) is maintained between the optical NRZ signal and the sine wave for energizing the EA modulator 5. In view of this, the output of the EA modulator 5 is partially retrieved by the optical signal generation circuit depicted in FIG. 3, and the result is presented to ALC 7. ALC 7 detects variations in the optical output of the EA modulator 5 and performs negative feedback in relation to the optical delay circuit 4 in such a way that the optical output of the EA modulator 5 is at a maximum.

Specifically, the amount of delay in the optical delay circuit 4 is adjusted by the ALC circuit 7 in such a way that the optical output of the EA modulator 5 is at a maximum. As a result, timing self-adjustment becomes possible, and the timing relation depicted in FIG. 2 is constantly maintained. A highly reliable optical NRZ/RZ converter can therefore be obtained.

Figure 4:
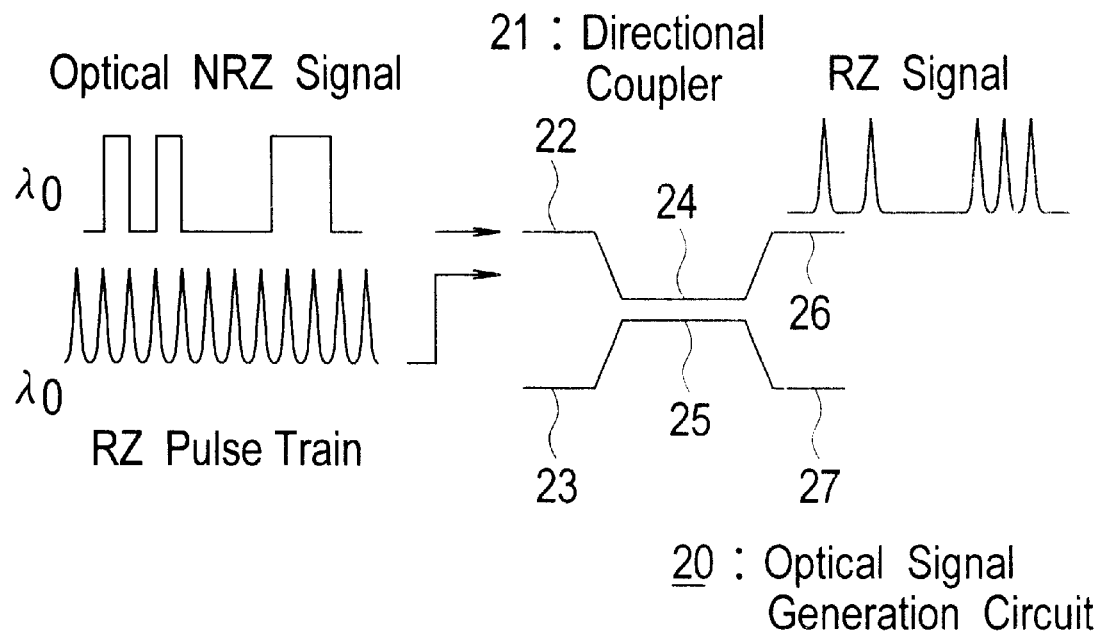
FIG. 4 is a block diagram depicting an optical signal generation circuit according to a second embodiment of the present invention.

FIG. 4 is a block diagram depicting an optical signal generation circuit 20 according to a second embodiment of the present invention. The optical signal generation circuit 20 of the second embodiment has an optical directional coupler 21. The directional coupler 21 has input ports 22 and 23 for optical signals, coupled waveguide regions 24 and 25, and output ports 26 and 27 for optical signals.

The input port 22 is simultaneously presented with an RZ pulse train and an optical NRZ signal having the same wavelength (designated as $\lambda_0$ in this case). These proceed to the coupled waveguide region 24 of the directional coupler 21. In the coupled waveguide region 24, a nonlinear phase shift is induced in the RZ pulse train by the high-intensity optical NRZ signal. As a result, only the RZ pulses corresponding to the optical NRZ signal are retrieved from the output port 26.

For this reason, the directional coupler 21 is made, for example, of a nonlinear medium capable of exhibiting the optical Kerr effect, such as silica fiber, $LiNbO_3$, or another dielectric substance, or InGaAs/InP or another compound semiconductor. In addition, the structure has complete input/output symmetry. The timing (between the optical NRZ signal and the RZ pulse train) provided to the input port 22 of the directional coupler 21 is adjusted such that the peaks of individual RZ pulses are disposed in the centers of the bit slots of the optical NRZ signal.

Described first is the operation of a system in which the optical intensity of both the optical NRZ signal and the RZ pulse train is sufficiently low not to create any nonlinear effects. All the energy is transferred from the coupled waveguide region 24 to the coupled waveguide region 25 when the relation between the RZ pulses and the optical NRZ signal reaching the coupled waveguide region 24 is Lc=$\pi/(2k)$, where Lc is the length of the coupled waveguide in the coupled waveguide region 24. As a result, both optical signals are outputted from the output port 27.

Here, k is a constant expressing the coupling strength between the coupled waveguide region 24 and the coupled waveguide region 25. This value is determined by the extent to which two guided wave modes are superposed on each other on the assumption that the coupled waveguide regions 24 and 25 are independent from each other, and the guided wave mode existing in the coupled portion is approximated based on a linear coupling arrangement between the guided wave modes induced in these two coupled waveguide regions. Specifically, the k-value depends strongly on the distance between the two coupled waveguide regions, the width of each waveguide region, and the difference in the refractive index between each waveguide region and peripheral components.

The following is a description of a system in which the optical intensity of the inputted NRZ signal alone is sufficiently high to induce nonlinear effects. The result is that feeding such an optical NRZ signal to the coupled waveguide region 24 induces a nonlinear phase shift based on self-phase modulation (SPM) in the optical NRZ signal, and a nonlinear phase shift based on cross-phase modulation (XPM) in the RZ pulses. In this case, depending on the RZ pulses, cross-phase modulation occurs in the optical NRZ signal, and self-phase modulation occurs in the RZ pulses. It is believed, however, that the nonlinear effects caused by the RZ pulse train can be ignored here.

The nonlinear phase shift brought about by the optical NRZ signal is expressed by Eq. 1 below.

$$\phi(NRZ)=(2\pi Lc/\lambda)n_2|ANRZ|^2 \qquad \text{Eq. 1}$$

The nonlinear phase shift brought about by the RZ pulses is expressed by Eq. 2 below.

$$\phi(RZ)=(2\pi Lc/\lambda)an_2|ANRZ|^2 \qquad \text{Eq. 2}$$

In these equations, $n_2$, $\lambda$, and ANRZ designate a nonlinear refractive index, optical wavelength, and optical NRZ signal amplitude, respectively, of the coupled waveguide region 24. In addition, $a$ is a constant expressing the contribution from XPM (0.67 to 2). The condition $a=2$ occurs when the optical NRZ signal and RZ pulse train both lie in the same polarization plane with the two types of signal light.

The symmetry of the directional coupler is commonly disrupted if a phase shift occurs in signal light traveling through the coupled waveguide region 24. This is accompanied by a reduction in the transfer of energy from the coupled waveguide region 24 to the coupled waveguide region 25. In particular, substantially no energy is transferred to the coupled waveguide region 25 when the phase shift satisfies the relation expressed by Eq. 3 below. As a result, light presented to the input port 22 is outputted from the output port 26.

$$\phi=3^{1/2}kLc \qquad \text{Eq. 3}$$

When this principle is applied to the present embodiment, simultaneous input of an optical NRZ signal induces cross-phase modulation in the RZ pulse train. The RZ pulse train is outputted from the output port 26 of the directional coupler if this nonlinear phase shift satisfies the relation expressed by Eq. 3 above.

This phase shift occurs only when the optical NRZ signal and RZ pulse train are temporally superposed. Only the RZ pulses corresponding to the data carried by the optical NRZ signal will therefore be outputted from the output port 26. As a result, conversion from an NRZ format to an RZ format can be achieved.

Strictly speaking, an optical NRZ signal may develop an SPM-based phase shift $\phi$ (NRZ). Such an optical NRZ signal will therefore leak or penetrate into the output port 26. Let us consider a case in which an optical NRZ signal lies in the same polarization plane as the RZ pulse train, as described above. In this case, the phase shift in the optical NRZ signal is less than the phase shift in the RZ pulse train, in proportion to the absence of the multiplication coefficient $a$. In addition, phase variations affecting the transfer of energy by the directional coupler elicit swift response in relation to the critical value Pe of optical intensity. Consequently, the phase shift induced in the optical NRZ signal by SPM is not considered to be a problem in practical terms.

Figure 5:
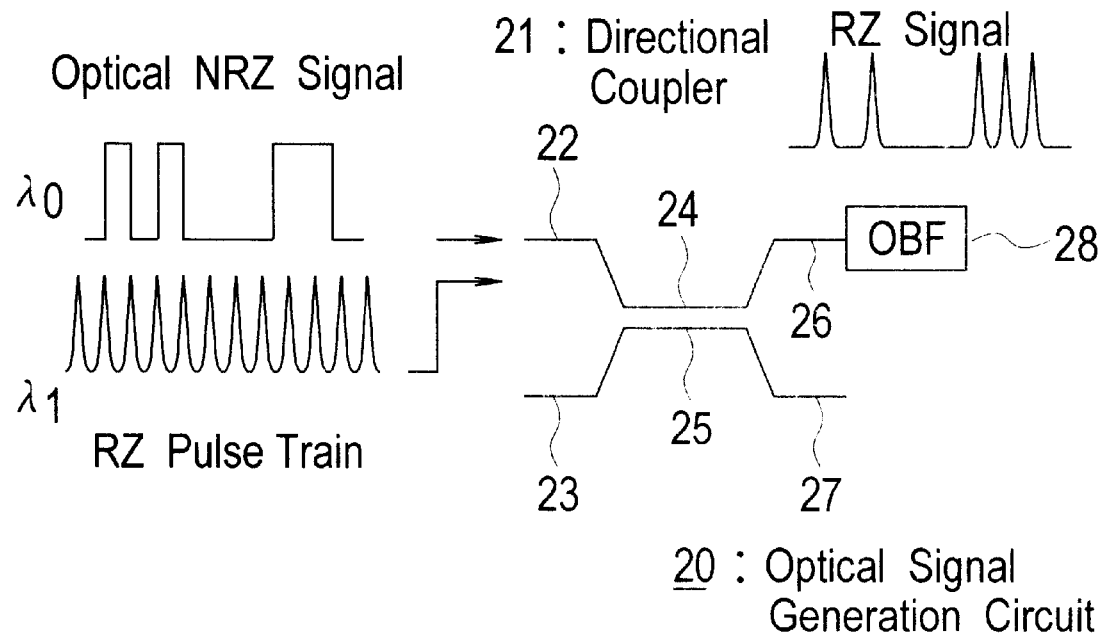
FIG. 5 is a block diagram depicting a modified optical signal generation circuit according to the second embodiment of the present invention.

A modified example of the optical signal generation circuit 20 pertaining to the second embodiment will now be described using FIG. 5. The basic structure of this modified example is the same as that of the second embodiment depicted in FIG. 4. The modified example is different, however, in that an optical band-pass filter (OBF) 28 is placed in front of the output port 26.

In the second embodiment described above, the RZ pulse train and optical NRZ signal inputted to the directional coupler 21 had the same wavelength ($\lambda_0$). By contrast, the modified example is configured such that the two wavelengths differ from each other. In other words, the modified example is such that an optical NRZ signal of wavelength $\lambda_0$ and an RZ pulse train of wavelength $\lambda_1$ are simultaneously presented to the input port 22.

These proceed to the coupled waveguide region 24 of the directional coupler 21. In the coupled waveguide region 24, a nonlinear phase shift is induced in the RZ pulse train by the high-intensity optical NRZ signal. This feature is the same as in the second embodiment. The RZ pulse train is therefore outputted from the output port 26 of the directional coupler.

In this case, the SPM-induced phase shift also occurs in the optical NRZ signal, and the optical NRZ signal leaks into the output port 26. This feature is also the same as in the second embodiment. In the modified example, however, the leakage of the optical NRZ signal to the output port 26 is prevented by the OBF 28 connected to the output port 26. Specifically, OBF 28 blocks the wavelength $\lambda_0$ of the optical NRZ signal and transmits the wavelength $\lambda_1$ of the RZ pulse train. This modified example thus allows an even more efficient NRZ/RZ conversion device to be implemented. In addition, there is no need for the wavelength of the RZ pulse train to be equal to the wavelength of the optical NRZ signal, so the wavelength of the RZ pulse train can be set to a level suitable for transmitting data through an optical transmission line connected to the optical signal generation circuit.

Figure 6:
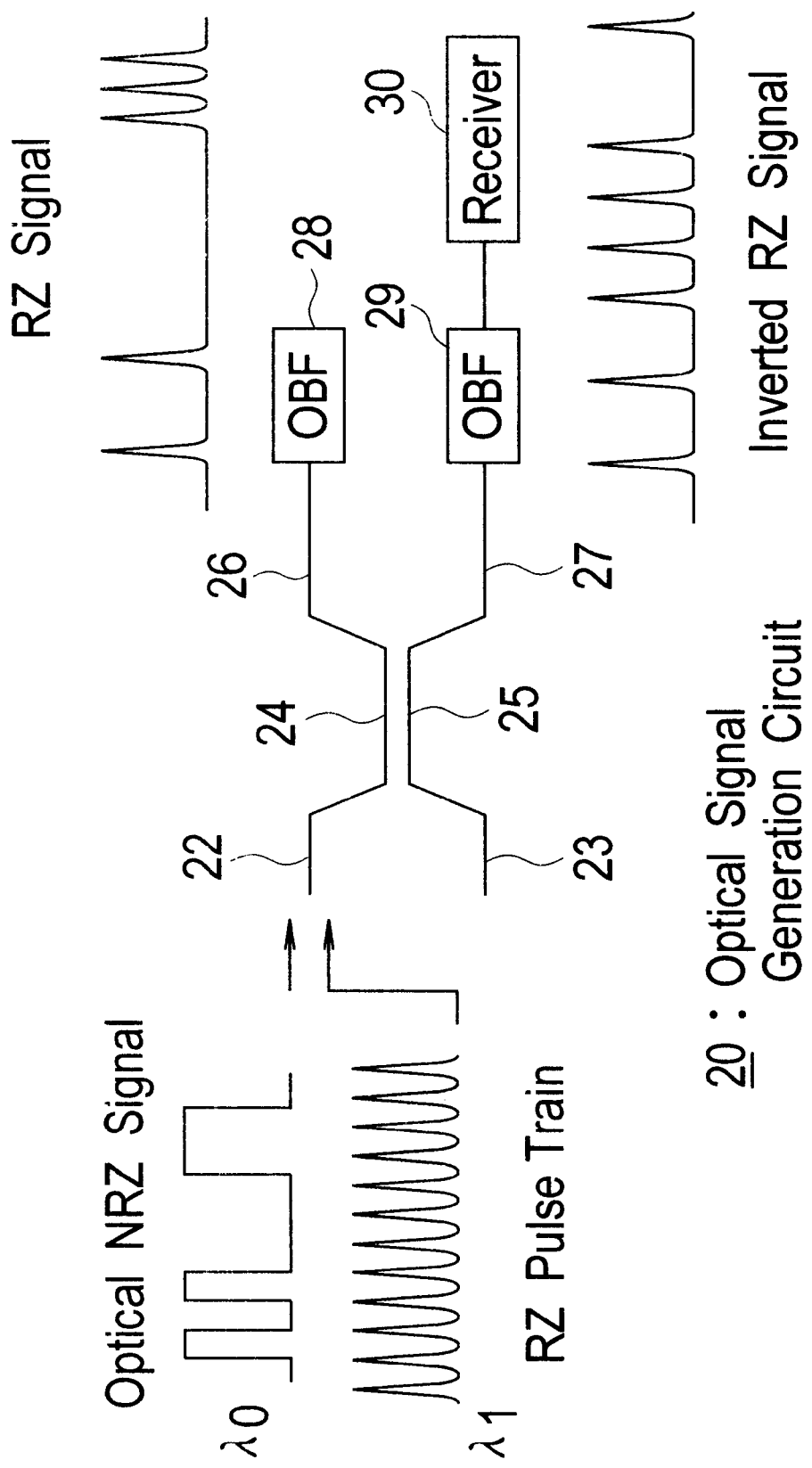
FIG. 6 is a block diagram depicting still another modified optical signal generation circuit according to the second embodiment of the present invention.

It is also effective for an OBF 29 and a receiver 30 to be connected to the subsequent stage of the output port 27, as shown in FIG. 6. In the second embodiment and the above-described modified example, RZ pulses corresponding to data carried by the optical NRZ signal are guided toward the output port 26 by creating a phase shift in the RZ pulse train when the optical NRZ signal and the RZ pulse train are temporally superposed.

Conversely, no phase shift is induced in the RZ pulse train when there is no temporal superposition between the optical NRZ signal and the RZ pulse train. With the RZ pulse train, therefore, all the energy in the waveguide region 24 is transferred to the coupled waveguide region 25 in the manner described above. As a result, an RZ pulse train that does not correspond to the data carried by the optical NRZ signal is outputted to the output port 27.

A comparison between the RZ pulse train appearing at the output port 26 and the RZ pulse train appearing at the output port 27 yields a mutually inverted relation between these RZ pulse trains. An optical NRZ signal that has not undergone any phase modulation is outputted to the output port 27. Removing the optical NRZ signal by the OBF 29 yields an RZ pulse train inverted in relation to the RZ pulse train appearing at the output port 26. The RZ pulse signal received by the receiver 30 can be used to monitor the optical signal generation circuit 20.

Figure 7:
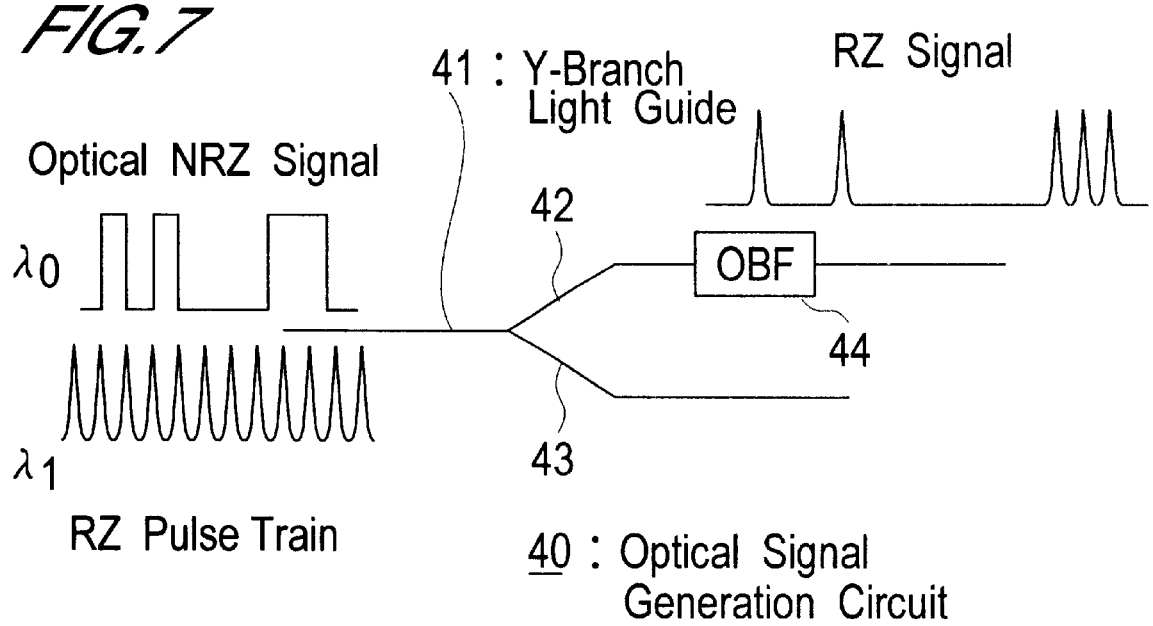
FIG. 7 is a block diagram depicting an optical signal generation circuit according to a third embodiment of the present invention.

FIG. 7 is a block diagram depicting an optical signal generation circuit 40 according to a third embodiment of the present invention. The optical signal generation circuit 40 of the third embodiment is designed to perform NRZ/RZ conversion by utilizing the nonlinear effects generated in an Y-branch light waveguide. A detailed description will now be given with reference to FIGS. 7 and 8(A) and (B).

The optical signal generation circuit 40 of the third embodiment has a Y-branch light waveguide 41. This Y-branch light waveguide 41 has an output port 42 and an output port 43. The Y-branch light waveguide 41 is made of a material having the same nonlinear effects as in the second embodiment. A primary guided wave mode and a first guided wave mode are excited in the Y-branch light waveguide 41.

In the optical signal generation circuit 40 of the third embodiment, an optical NRZ signal of wavelength $\lambda_0$ and an RZ pulse train of wavelength $\lambda_1$ are simultaneously inputted to the Y-branch light waveguide 41 in the same manner as in the second embodiment. In the process, the timing between the optical NRZ signal and the RZ pulse train must be adjusted such that the peaks of individual RZ pulses are disposed in the centers of the bit slots of the optical NRZ signal. This feature is the same as in the second embodiment.

Figure 8A:
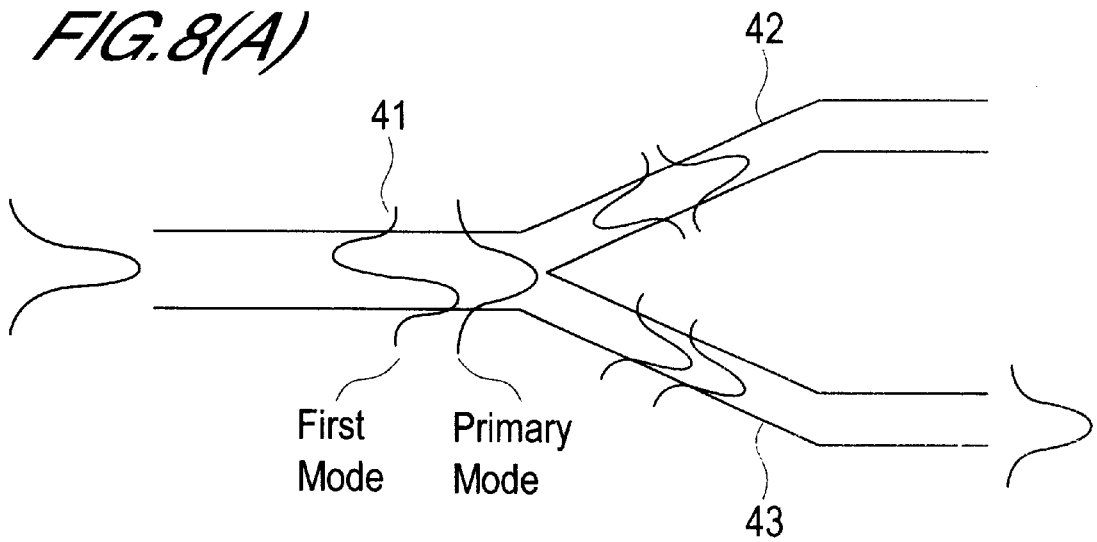
FIGS. 8(A) and (B) are diagrams illustrating the manner in which each mode propagates in accordance with the third embodiment.

A primary guided wave mode and a first guided wave mode related to an RZ pulse are depicted in FIG. 8(A), assuming that this pulse alone is inputted to the Y-branch light waveguide 41. Upon reaching the Y-branch portion, each mode splits up and proceeds to the output port 42 and the output port 43. At the output port 42, the primary guided wave mode and the first guided wave mode cancel each other out, with no pulse emerging. At the output port 43, on the other hand, the primary guided wave mode and the first guided wave mode reinforce each other, resulting in a pulse. This outcome can be achieved by appropriately setting the distance between the input portion and the Y-branch portion of the Y-branch light waveguide 41.

Let us now assume that an optical NRZ signal and an RZ pulse are inputted to the Y-branch light waveguide 41. At this time, the optical NRZ signal induces cross-phase modulation in the RZ pulse train if the optical intensity of the optical NRZ signal is sufficiently high to induce a nonlinear effect. The RZ pulses also induce cross-phase modulation in the optical NRZ signal. Let us also assume that the nonlinear effect created by the RZ pulse train can be ignored in this case. For this reason, the intensity of the RZ pulse train is set to a level at which the self-phase modulation of the RZ pulse train can be ignored, as can the cross-phase modulation of the optical NRZ signal.

Figure 8B:
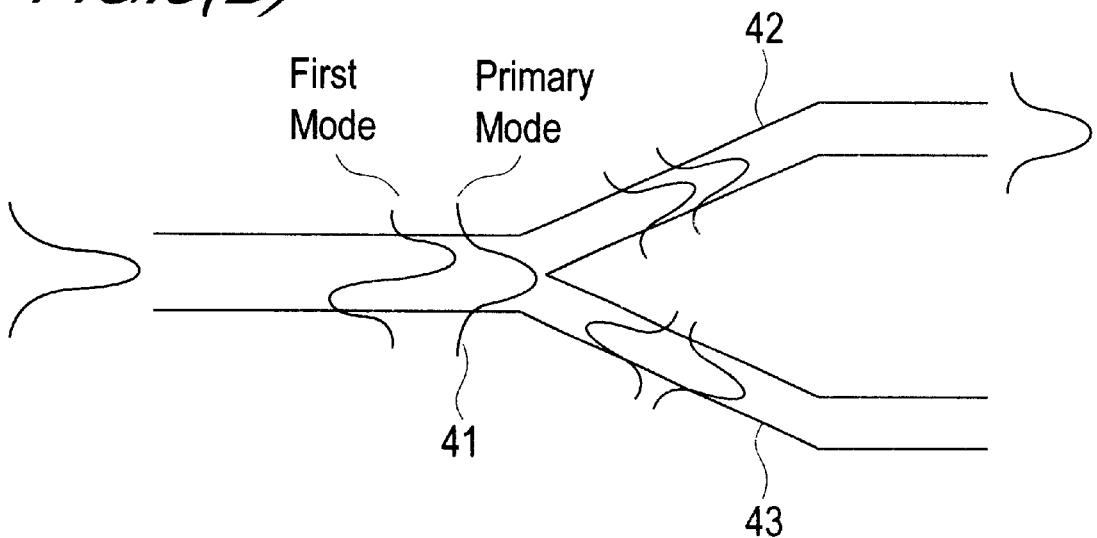

When self-phase modulation is induced in the RZ pulse, the extent of this phase modulation differs for the primary mode and the first mode. Consequently, the two modes have varying phase relations immediately in front of the Y-branch portion. In the particular case illustrated in FIG. 8(B), the primary guided wave mode and the first guided wave mode reinforce each other and produce a pulse at the output port 42 when the phase difference between the two modes changes by $\pi$ immediately in front of the Y-branch portion. At the output port 43, on the other hand, the primary guided wave mode and the first guided wave mode cancel each other out, with no pulse emerging.

This cross-phase modulation of the RZ pulse occurs only when the optical NRZ signal and RZ pulse train are temporally superposed. Only the RZ pulses corresponding to the data carried by the optical NRZ signal will therefore be outputted from the output port 42. As a result, conversion from an NRZ format to an RZ format can be achieved.

The manner in which an SPM-based phase shift is induced in the optical NRZ signal by the optical NRZ signal is the same as in the second embodiment. The phase variation induced in the optical NRZ signal remains small when the optical NRZ signal lies in the same polarization plane as the RZ pulse train. At this time, the phase relation between the primary guided wave mode and the first guided wave mode of the optical NRZ signal is intermediate between FIGS. 8(A) and 8(B). Consequently, the optical NRZ signal emerges both at the output port 42 and at the output port 43. Stray light from the optical NRZ signal can be removed by providing the optical RZ signal and the RZ pulse train with different wavelengths and connecting the output port 42 to an OBF 44. Adequate NRZ/RZ conversion can thereby be achieved.

Figure 9:
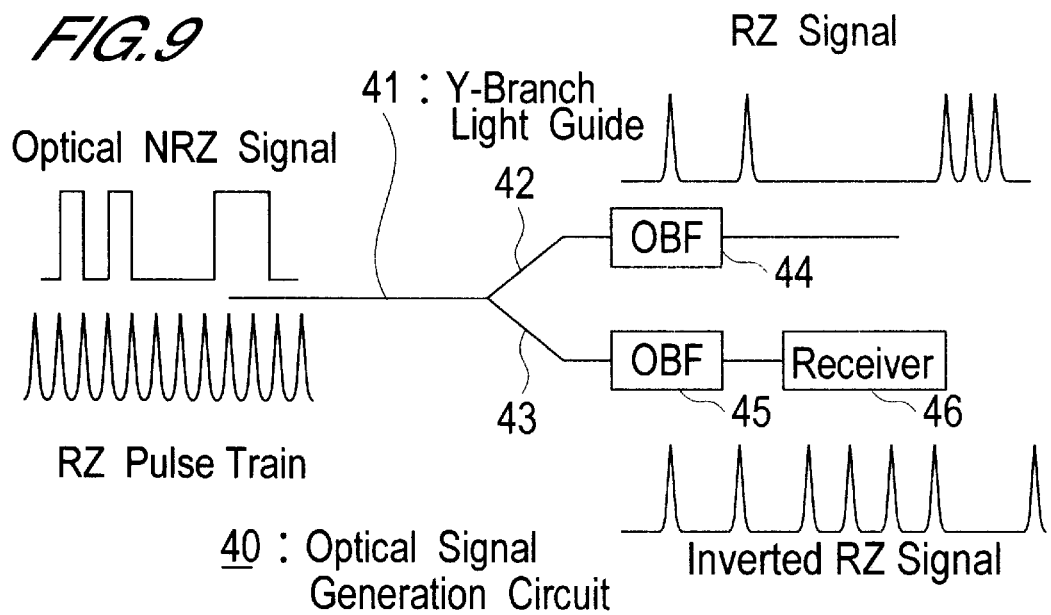
FIG. 9 is a block diagram depicting a modified optical signal generation circuit according to the third embodiment of the present invention.

A modified example of the third embodiment will now be described using FIG. 9. An RZ pulse train inverted in relation to the RZ pulse train appearing at the output port 42 can be obtained by disposing an OBF 45 at the output port 43 and removing stray light from the optical NRZ signal. The RZ pulse signal received by the receiver 46 can be used to monitor the optical signal generation circuit 40.

A block diagram depicting an optical signal generation circuit 50 according to a fourth embodiment of the present invention is shown below. In the optical signal generation circuit 50 of the fourth embodiment, the polarization plane of an RZ pulse is rotated using the XPM induced in an RZ pulse train traveling through an optical fiber to retrieve an RZ pulse having the desired polarization plane and to perform NRZ/RZ conversion. A detailed description will now be given using FIGS. 10 and 11.

Figure 10:
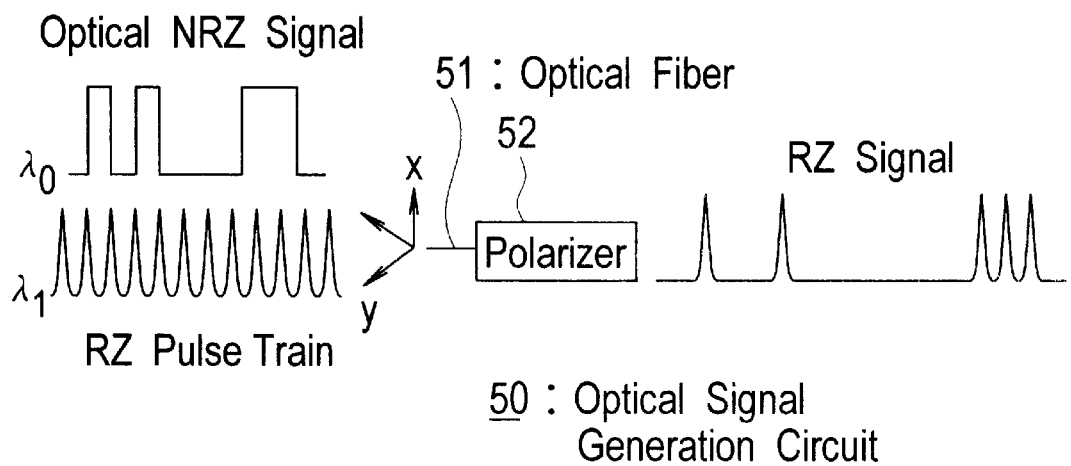
FIG. 10 is a block diagram depicting an optical signal generation circuit according to a fourth embodiment of the present invention.

FIG. 10 is a block diagram depicting the structure of the optical signal generation circuit 50 pertaining to the fourth embodiment. The optical signal generation circuit 50 has an optical fiber 51 and a polarizer 52 connected to this optical fiber 51. Silica fiber may, for example, be used as the optical fiber 51. To simplify the description that follows, it is assumed that the optical fiber 51 has no birefringence.

In the optical signal generation circuit 50 of the fourth embodiment, an optical NRZ signal of wavelength $\lambda_0$ and an RZ pulse train of wavelength $\lambda_1$ are simultaneously inputted to the optical fiber 51. In the process, the timing between the optical NRZ signal and the RZ pulse train must be adjusted such that the peaks of individual RZ pulses are disposed in the centers of the bit slots of the optical NRZ signal. This feature is the same as in the above-described embodiments.

Figure 11:
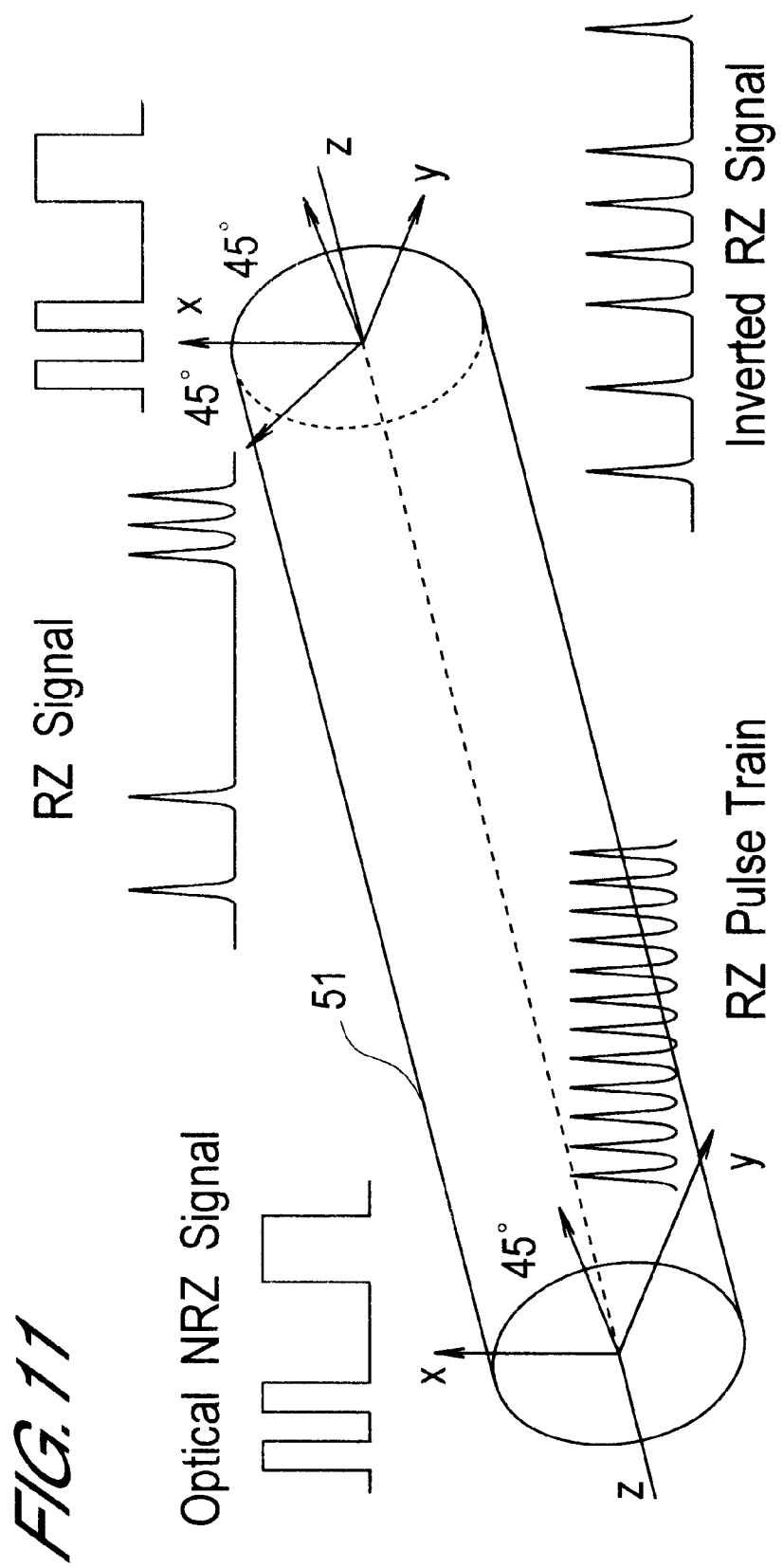
FIG. 11 is a diagram illustrating the operating principle of the fourth embodiment of the present invention.

In the fourth embodiment, the optical NRZ signal and the RZ pulse train have the same wavelength. The polarization plane of the RZ pulse train is set at 45° in relation to the polarization plane of the optical NRZ signal before the two are inputted to the optical fiber 51. The relation is depicted in FIG. 11. Specifically, the two are inputted to the optical fiber 51 such that the polarization plane of the optical NRZ signal coincides, for example, with the X-axis, where X and Y designate axes perpendicular to the optical axis of the optical fiber 51, and Z designates the optical axis of the optical fiber 51. At this time, the RZ pulse train is inputted to the optical fiber 51 such that the polarization plane of the train is inclined 45° to the X-axis. As a result, the RZ pulse train has components within the X-Z plane (that is, within the polarization plane of the NRZ signal) and the Y-Z plane.

If the phase of one of the components of the RZ pulse train varies in relation to the phase of the other component in this state, the varying component changes from a linearly polarized wave to a circularly polarized wave. The polarization plane of this component at the outgoing end of the optical fiber 51 can therefore be shifted in relation to the initial polarization plane. This is achieved by causing the optical NRZ signal to induce cross-phase modulation in the RZ pulse train.

Specifically, the optical NRZ signal induces cross-phase modulation in the RZ pulse train if the optical intensity of the optical NRZ signal is sufficiently high to produce a nonlinear effect. The RZ pulses induce cross-phase modulation in the optical NRZ signal. Let us also assume that the nonlinear effect produced by the RZ pulse train can be ignored in this case. For this reason, the intensity of the RZ pulse train is set to a level at which the self-phase modulation of the RZ pulse train can be ignored, as can the cross-phase modulation of the optical NRZ signal.

This produces a phase difference $\Delta\phi$ between the two components of an RZ pulse in accordance with the time during which the optical NRZ signal is "on." This $\Delta\phi$ is expressed by Eq. 4 below.

$$\Delta\phi = 2\pi/n_2(4/3)A^2L \qquad \text{Eq. 4}$$

In the equation 4, $n_2$ is a nonlinear refractive index of the optical fiber 51, A is an amplitude of the optical NRZ signal travelling through the optical fiber 51 and L is the length of the optical fiber 51.

In the particular case of $\Delta\phi=\pi$, the RZ pulse subjected to phase modulation in accordance with the optical NRZ signal at the outgoing end of the optical fiber 51 is a linearly polarized wave orthogonal to the polarization plane thereof at the incoming end. An RZ optical signal having the same pattern as the optical NRZ signal can be obtained as an output of the polarizer 52 by aligning the polarization direction of the polarizer 52 with the direction of linear polarization of the RZ pulse. In this case, the required peak intensity PNRZ (on-level intensity) of the optical NRZ signal is expressed by Eq. 5 below.

$$PNRZ = 3\lambda A_{eff}/(8 L_{eff} n_2) \qquad \text{Eq. 5,}$$

where $L_{eff}=(1/\alpha)[1-\exp(-\alpha L)]$, and $A_{eff}$ is the effective core area.

For example, PNRZ is about 262 mW if L=5 km, $\lambda$=1555 nm, $A_{eff}$=50 $\mu m^2$, $n_2$=2.5×10$^{-20}$ m$^2$/W, and $\alpha$=0.046 km$^{-1}$.

Even when the signal light of the optical NRZ signal has a different wavelength from the RZ pulse train, the relation according to which the peak of each RZ pulse is disposed in the center of a bit slot of the optical NRZ signal can be maintained for some time by keeping the wavelength dispersion of the fiber sufficiently low. The above-described effect can therefore be obtained.

A modified example of the fourth embodiment is described using FIG. 12. In this modified example, a polarization beam splitter 53 is connected to the optical fiber 51 of the fourth embodiment. The polarization beam splitter 53 transmits polarized waves of RZ pulses converted by an optical NRZ signal. Polarized waves of unconverted RZ pulses are therefore reflected. In this case, RZ pulses reflected by the polarization beam splitter 53 are in a mutually inverted relation with RZ pulses transmitted by the polarization beam splitter 53. The optical signal generation circuit 50 can therefore be monitored through reception of such inverted RZ pulse signals by a receiver 54.

Figures 13A, 13B:
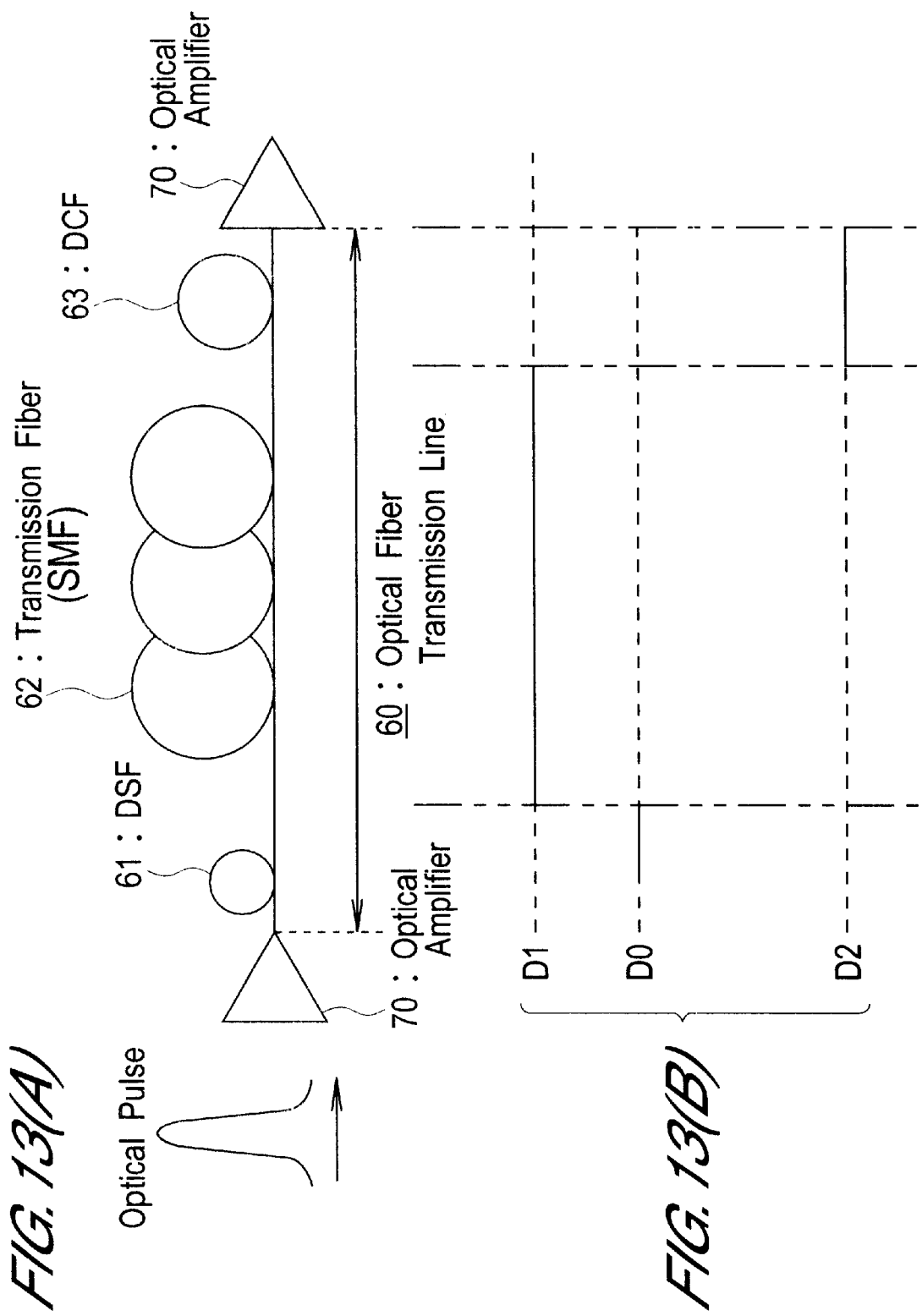
FIGS. 13(A) and (B) are a diagram depicting an optical transmission line according to a fifth embodiment of the present invention.

FIGS. 13(A) and (B) depict an optical transmission line for transmitting optical RZ signals/soliton pulses generated by the above-described optical signal generation circuit in accordance with a fifth embodiment. This optical transmission line has a structure in which so-called optical amplifier spans are repeatedly connected. To simplify the description, however, only one optical amplifier span is shown in FIGS. 13(A) and (B). Specifically, FIG. 13(A) is a diagram depicting this optical amplifier span, and FIG. 13(B) is a dispersion map for this optical amplifier span.

The optical amplifier span is composed of an optical fiber transmission line 60 comprising a dispersion-shifted fiber (DSF) 61 having zero dispersion at the wavelength of the inputted optical pulse, a transmission fiber 62 obtained using a single-mode fiber (SMF), and a dispersion-compensated fiber (DCF) 63, all sequentially connected as shown in FIG. 13(A). Such optical amplifier spans are repeatedly connected through optical amplifiers 70.

The following relationships can be obtained by letting D0 be the dispersion value of the DSF 61, D1 the dispersion value of the transmission fiber 62, and D2 the dispersion value of the DCF 63: D0 is substantially equal to 0, D1>D0, and D2<0. In the description that follows, the length of the DSF 61 is 10 km (dispersion value: 0 ps/nm/km), the length of the transmission fiber 62 is 50 km (dispersion value: 17 ps/nm/km), and the length of the DCF 63 is 10 km (dispersion value: −82.6 ps/nm/km). In this embodiment, mean dispersion of the optical amplifier span is defined by the dispersion value of the transmission fiber 62 and the dispersion value of the DCF 63 because the dispersion value of the DSF 61 is zero.

A case in which an optical pulse having the optical intensity necessary for soliton transmission is incident on the optical amplifier span will be considered. The corresponding state of the optical pulse is schematically shown in FIGS. 14(A) and (B). FIG. 14(A) depicts the optical amplifier span shown in FIG. 13(A). Items (a) to (d) as shown in FIG. 14(B) depict amplified optical pulses.

A nonlinear chirp is created by self-phase modulation when an optical pulse amplified to a prescribed optical intensity by an optical amplifier 70 (disposed inside the optical signal generation circuit or in front of the optical fiber transmission line 60) propagates inside the DSF 61 (an optical pulse (a) as shown in FIG. 14(B)). The chirp is oriented in the direction that cancels the effect of anomalous dispersion. At this time, the dispersion value of the DSF 61 is zero, as described above. Consequently, the waveform of the optical pulse propagating therethrough remains unchanged, and only the spectrum of the optical pulse varies.

When an optical pulse having such a nonlinear chirp is admitted into the transmission fiber 62, compression overcomes the effect of dispersion (an optical pulse (b) as shown in FIG. 14(B)). This compression, in addition to being created by the fact that the optical pulse has a nonlinear chirp, is also created by an effect resulting from the self-phase modulation of the optical pulse in the transmission fiber 62. As t he optical pulse propagates through the transmission fiber 62, losses increase and intensity decreases. Under these conditions, the effect of anomalous dispersion demonstrated by the transmission fiber 62 finally appears in the optical pulse, and the width of the optical pulse increases (an optical pulse (c) as shown in FIG. 14(B)). The increase in width is linear.

The optical pulse thus widened is then linearly compressed in the DCF 63. As a result, the condition of the inputted optical pulse is substantially reproduced in the outlet portion of the DCF 63 (an optical pulse (d) as shown in FIG. 14(B)). The optical pulse is finally inputted to, and amplified by, another optical amplifier 70.

By repeatedly connecting such optical amplifier spans to form an optical transmission line, it is possible to generate soliton-type pulses of low chirp and waveform variation from the original optical pulses at the outlet of each optical amplifier span, that is, at the output of each optical amplifier. As a result, the optical pulses can propagate in a stable manner.

Figure 15A:
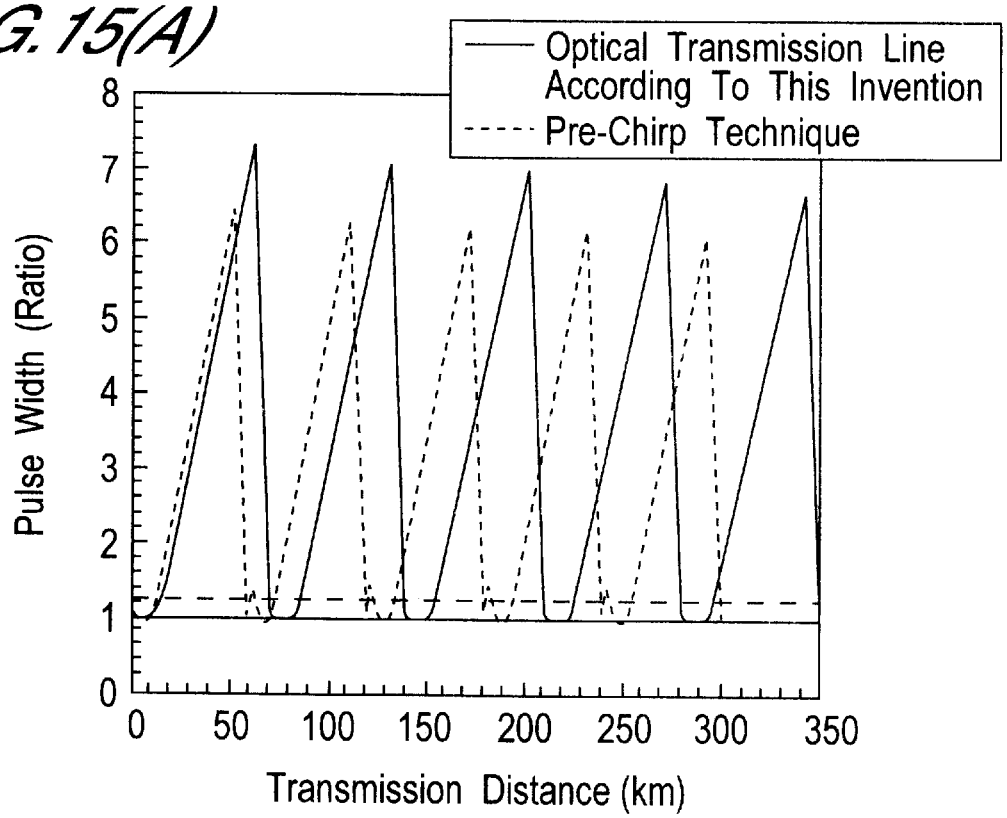
FIGS. 15(A) and (B) are diagrams depicting variations in the waveform and chirp that accompany propagation of pulses through the optical transmission line according to the fifth embodiment of the present invention.
Figure 15B:
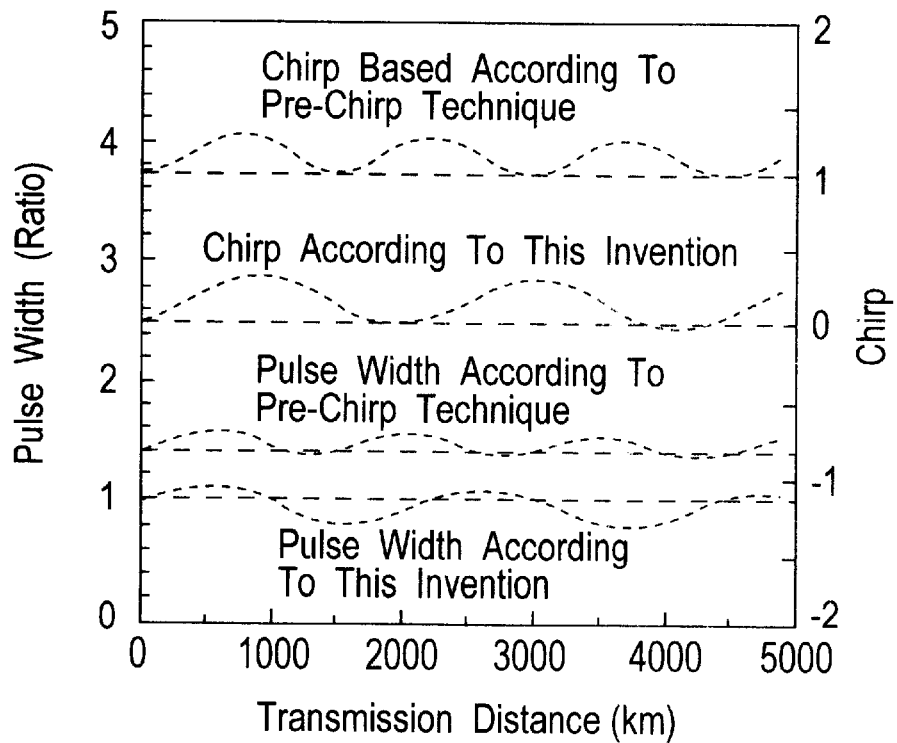

FIGS. 15(A) and (B) depict the results of calculating with the aid of the above-described fiber parameters the chirp variations and waveform variations accompanying the propagation of Gauss-type pulses having an input pulse width of 20 ps. In the optical transmission line 60 of the fifth embodiment, the mean dispersion value determined by the single-mode fiber 62 and the DCF 63 is 0.2 ps/nm/km. FIG. 15(A) is a plot of the pulse waveform variations inside a span, and FIG. 15(B) is a plot of the amount of chirp at the inlet to each span. For the sake of comparison, the span waveform variations and chirp amounts are plotted for a case in which a pre-chirp technique is used. The corresponding pre-chirp amount is −1.0.

It can be seen in FIG. 15(A) that the optical transmission line of the present invention differs from the pre-chirp technique in that the chirp at the inlet to each span is constantly kept near zero despite a significant increase in pulse width inside the transmission fiber 62. In the diagram shown in FIG. 15(B), pulse width is plotted on the vertical axis on the left, and chirp amount is plotted on the vertical axis on the right. It follows from FIG. 15(B) that the optical transmission line of the present invention differs from the pre-chirp technique in that stability can be achieved at a smaller pulse width and that the chirp amount is close to zero.

Another distinctive feature is that the corresponding pulse peak intensity is 44.7 mW for the pre-chirp technique and less than half that (17 mW) for the optical transmission line of the present invention. The burden on the optical amplifiers is reduced as a result.

Figures 16A, 16B:
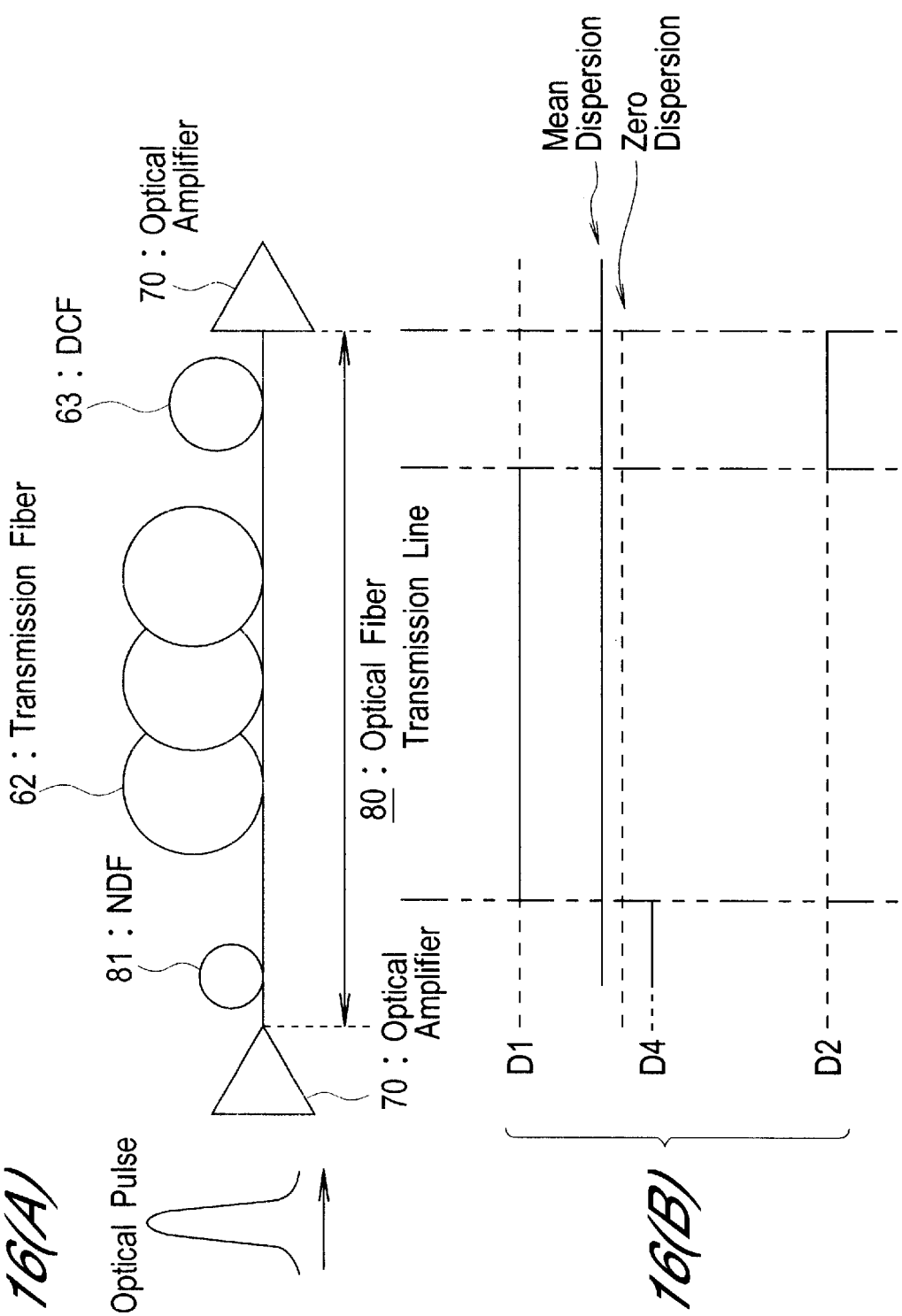
FIGS. 16(A) and (B) are a diagram depicting an optical transmission line according to a sixth embodiment of the present invention.

FIGS. 16(A) and (B) depict an optical transmission line according to a sixth embodiment of the present invention. The optical transmission line of the sixth embodiment has the same basic structure as that of the fifth embodiment. FIGS. 16(A) and (B) depict a single optical amplifier span in the same manner as in FIGS. 13(A) and (B). The same symbols are used to designate portions identical to those used for the optical transmission line of the fifth embodiment. Specifically, FIG. 16(A) is a diagram depicting an optical amplifier span, and FIG. 16(B) is a dispersion map of this optical amplifier span.

In the sixth embodiment as well, a single optical amplifier span is composed of an optical fiber transmission line 80, as shown in FIG. 16(A). The optical fiber transmission line 80 comprises a normal-dispersion fiber (NDF) 81 having normal dispersion at the wavelength of the inputted optical pulse, a transmission fiber 62 obtained using a single-mode fiber (SMF), and a dispersion-compensated fiber (DCF) 63, all connected into a sequential arrangement.

The following relationships can be obtained by letting D4 be the dispersion value of the NDF 81, D1 the dispersion value of the transmission fiber 62, and D2 the dispersion value of the DCF 63: D4<0, D1>D0, and D2<0. In the description that follows, the length of the DSF 61 is 10 km (dispersion value: −1 ps/nm/km), the length of the transmission fiber 62 is 50 km (dispersion value: 17 ps/nm/km), and the length of the DCF 63 is 10 km (dispersion value: −82.6 ps/nm/km). Mean dispersion of the entire optical transmission line 80 is a very small positive value, as shown in FIG. 16(B).

The state of an optical pulse according to the sixth embodiment is schematically shown in FIGS. 17(A) and (B). FIG. 17(A) depicts the same optical amplifier as that shown in FIG. 16(A). When an optical pulse inputted to the optical amplifier span propagates inside the NDF 81, a nonlinear chirp is generated by self-phase modulation (an optical pulse (a) as shown in FIG. 17(B)), and a linear chirp is generated by the normal dispersion of the NDF 81. The width of the optical pulse transmitted by the NDF 81 increases because these two effects are blue chirps.

When an optical pulse is subsequently introduced into the transmission fiber 62, the blue chirp and the effect of self-phase modulation in the transmission fiber 62 (an optical pulse (b) as shown in FIG. 17(B)) result in compression. This compression effect is primarily due to the blue chirp effect. In the sixth embodiment, the nonlinear and linear chirp effects created in the NDF 81 are further added, and the optical pulse is compressed with even greater efficiency. The result is that even when linear pulse widening occurs for a second time in the transmission fiber 62, this widening can be suppressed more effectively than in the fifth embodiment (an optical pulse (c) as shown in FIG. 17(B)). The optical pulse is subsequently inputted to the DCF 63 and is linearly compressed there. As a result, the condition of the inputted optical pulse is substantially reproduced in the outlet portion of the DCF 63 (an optical pulse (d) as shown in FIG. 17(B)).

Using an NDF as the fiber disposed in front of the transmission fiber 62 in accordance with the sixth embodiment generates a linear blue chirp in addition to the nonlinear chirp resulting from self-phase modulation. These blue chirps result in greater pulse compression in the transmission fiber 62 and, in particular, suppress the linear pulse widening in the second half of the transmission fiber 62. The dispersion compensation requirements for the DCF 63 are relaxed or reduced as a result. In addition, the optical intensity needed to stabilize soliton pulses is further reduced by the frontal placement of the NDF 81.

The optical transmission lines of the above-described fifth and sixth embodiments can be adapted not only to the transmission of single-wavelength optical signals but also to wavelength-division multiplexing optical transmissions. Specifically, a plurality of signals having mutually different wavelengths may be integrated together using an optical multiplexing coupler, an AWG (Arrayed Waveguide Grating), or the like, and the result may be inputted to a transmission line.

Because an optical fiber has a dispersion slope, the dispersion value of an optical wavelength-division multiplexing transmission varies with the wavelength (channel). The resulting dispersion commonly increases with an increase in the wavelength of signal light. The self-phase modulation effect generated in the DSF 61 of the fifth embodiment or the NDF 81 of the sixth embodiment acts to eliminate such dispersion, however. The result is that each channel can be set to maximum pulse stability by adjusting the optical intensity of inputted optical pulses having various wavelengths.

Figure 18:
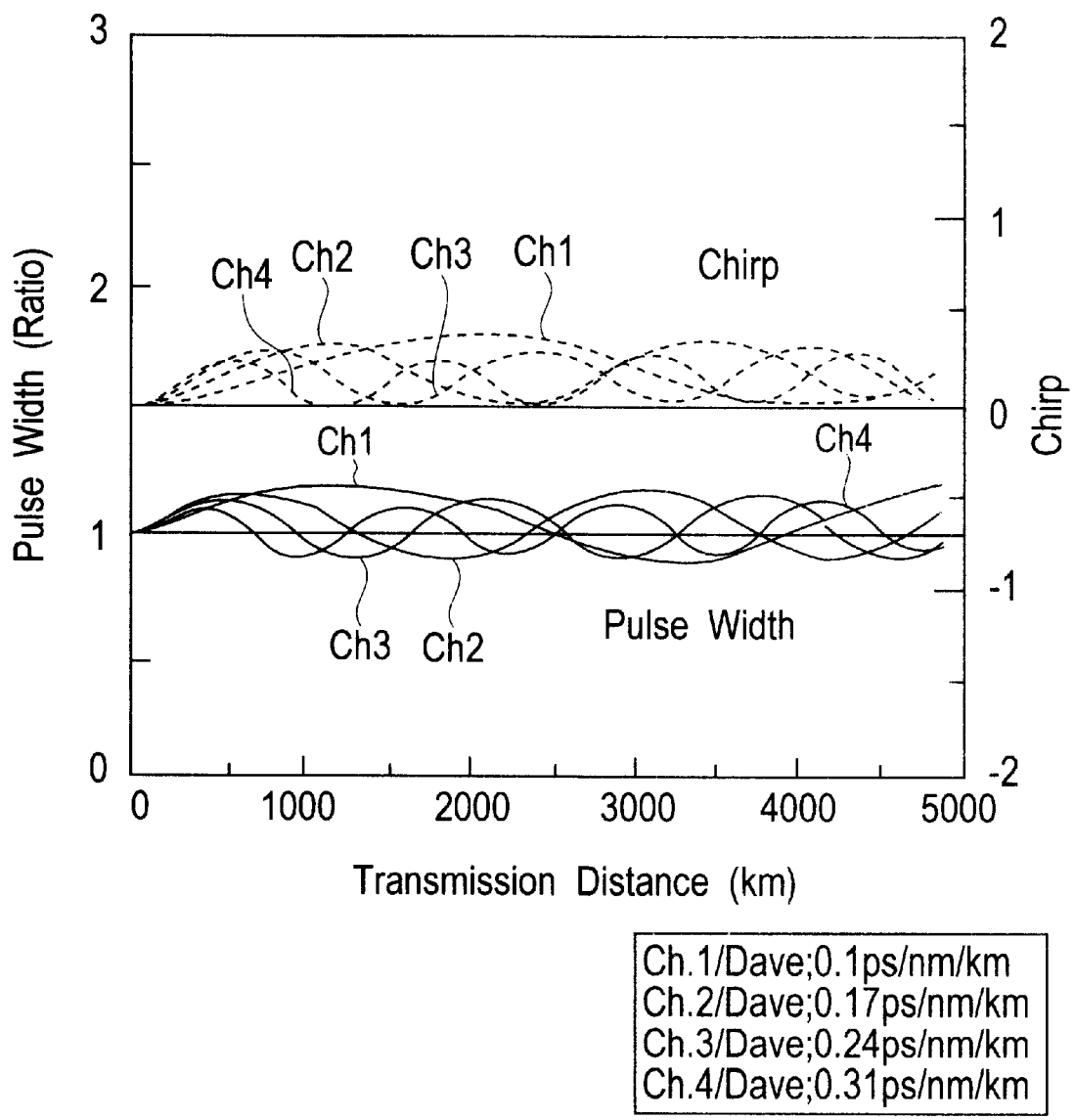
FIG. 18 is a diagram depicting variations in the waveform and chirp that accompany pulse propagation in the case of optical wavelength-division multiplexing transmission in the optical transmission line according to the sixth embodiment of the present invention.

Let us consider an example in which the optical transmission line of the sixth embodiment is used, and four wavelengths are multiplexed and transmitted through the line. FIG. 18 depicts the manner in which pulse width varies with transmission distance when pulses of optimized optical intensity propagate at various wavelengths (on various channels) in a case in which the transmission line has a dispersion slope of 0.07 ps/nm/km. In FIG. 18, pulse width is plotted on the vertical axis on the left, and chirp amount is plotted on the vertical axis on the right.

Let us assume that the mean dispersions of the transmission line are 0.1, 0.17, 0.24, and 0.31 ps/nm/km (in order from shorter wavelengths), and that the wavelength interval between the channels is 1 nm. The optical intensities of the channels shown in FIG. 18 are 9.0, 15.5, 21.7, and 28.2 mW (in order from shorter wavelengths), indicating that stable propagation can be achieved despite some variations in pulse width. This demonstrates that the system can be kept in an optimal state by selecting an appropriate setting for optical intensity even under conditions of varying dispersion, making it possible to achieve excellent results in reducing the effect of the dispersion slope. This can be achieved at lower levels when compared with the optimal settings for the pre-chirp technique under the same conditions. These settings are 26.4, 41.3, 48.7, and 69.8 mW (in order from shorter wavelengths). These results indicate that the optical wavelength-division multiplexing transmission system in accordance with the present invention makes it possible to markedly reduce the burden on optical amplifiers.

Figure 19A:
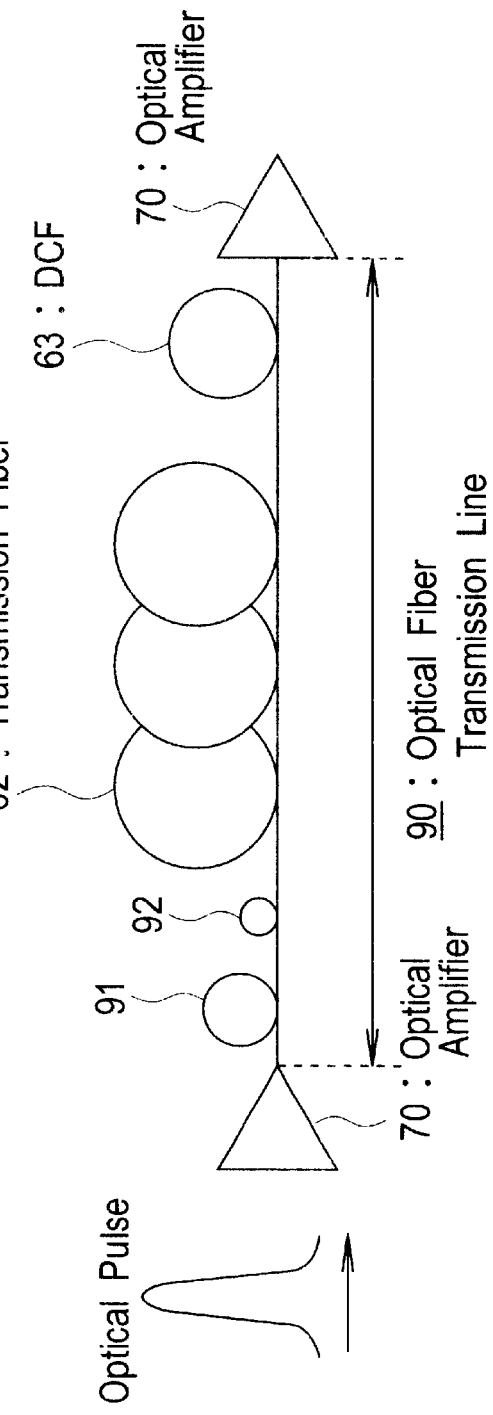
FIGS. 19(A) and (B) are a diagram depicting an optical transmission line according to a seventh embodiment of the present invention.
Figure 19B:
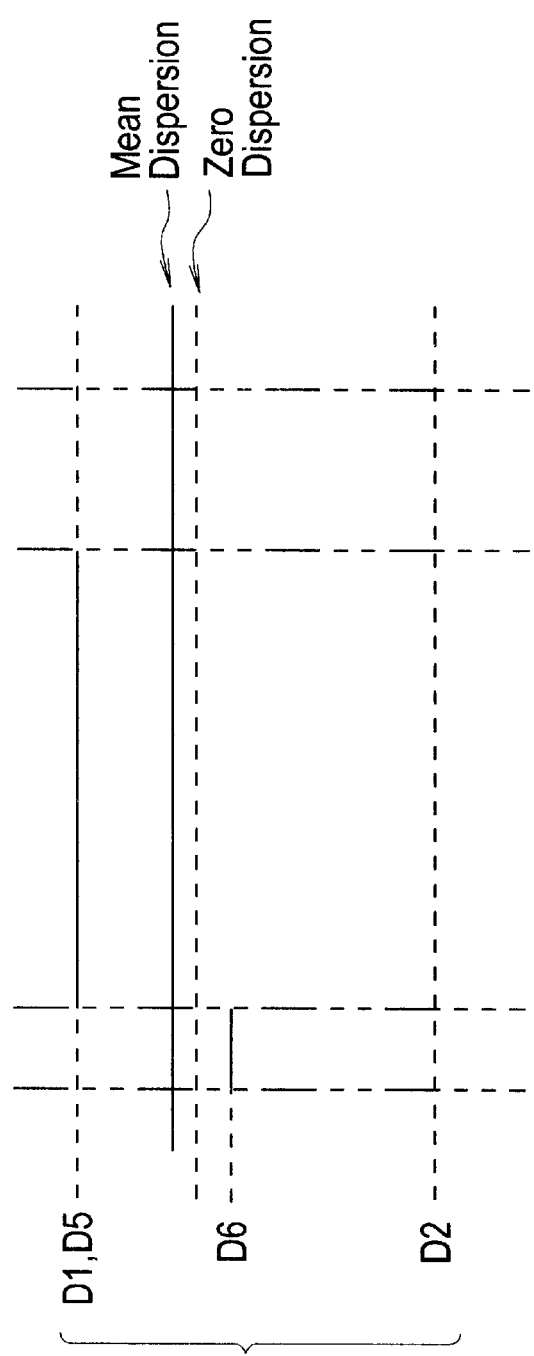

FIGS. 19(A) and (B) depict an optical transmission line according to a seventh embodiment of the present invention. The optical transmission line of the seventh embodiment has the same basic structure as that of the sixth embodiment. FIGS. 19(A) and (B) depict a single optical amplifier span in the same manner as in FIGS. 16(A) and (B). Specifically, FIG. 19(A) is a diagram depicting such an optical amplifier span, and FIG. 19(B) is a dispersion map of this optical amplifier span.

In the seventh embodiment as well, a single optical amplifier span is composed of an optical fiber transmission line 90, as shown in FIG. 19(A). In the optical fiber transmission line 90, a fiber 91 and a fiber 92 are configured as a group in which normal dispersion occurs at the wavelength of the inputted optical pulse. A transmission fiber 62 obtained using a single-mode fiber (SMF) and a dispersion-compensated fiber (DCF) 63 are sequentially connected to the subsequent stages of the fiber 91 and fiber 92 to complete the optical fiber transmission line 90.

Here, the fiber 91 is described as a single-mode fiber, and the fiber 92 is described as a dispersion-compensated fiber. Specifically, the following relationships can be obtained by letting D5 be the dispersion value of the fiber 91, D6 the dispersion value of the fiber 92, D1 the dispersion value of the transmission fiber 62, and D2 the dispersion value of the DCF 63: D5>0, D6<0, D1>0, and D2<0. In the description that follows, the dispersion value of the fiber 91 is 16 ps/nm/km, the fiber 92 is the dispersion-compensated fiber for compensating the dispersion of the fiber 91, the length of the transmission fiber 62 is 50 km (dispersion value: 16 ps/nm/km), and the length of the DCF 63 is 9.375 km (dispersion value: −85.0 ps/nm/km). Mean dispersion of the entire optical transmission line 90 is a very small positive value, as shown in FIG. 19(B).

Figures 20A, 20B:
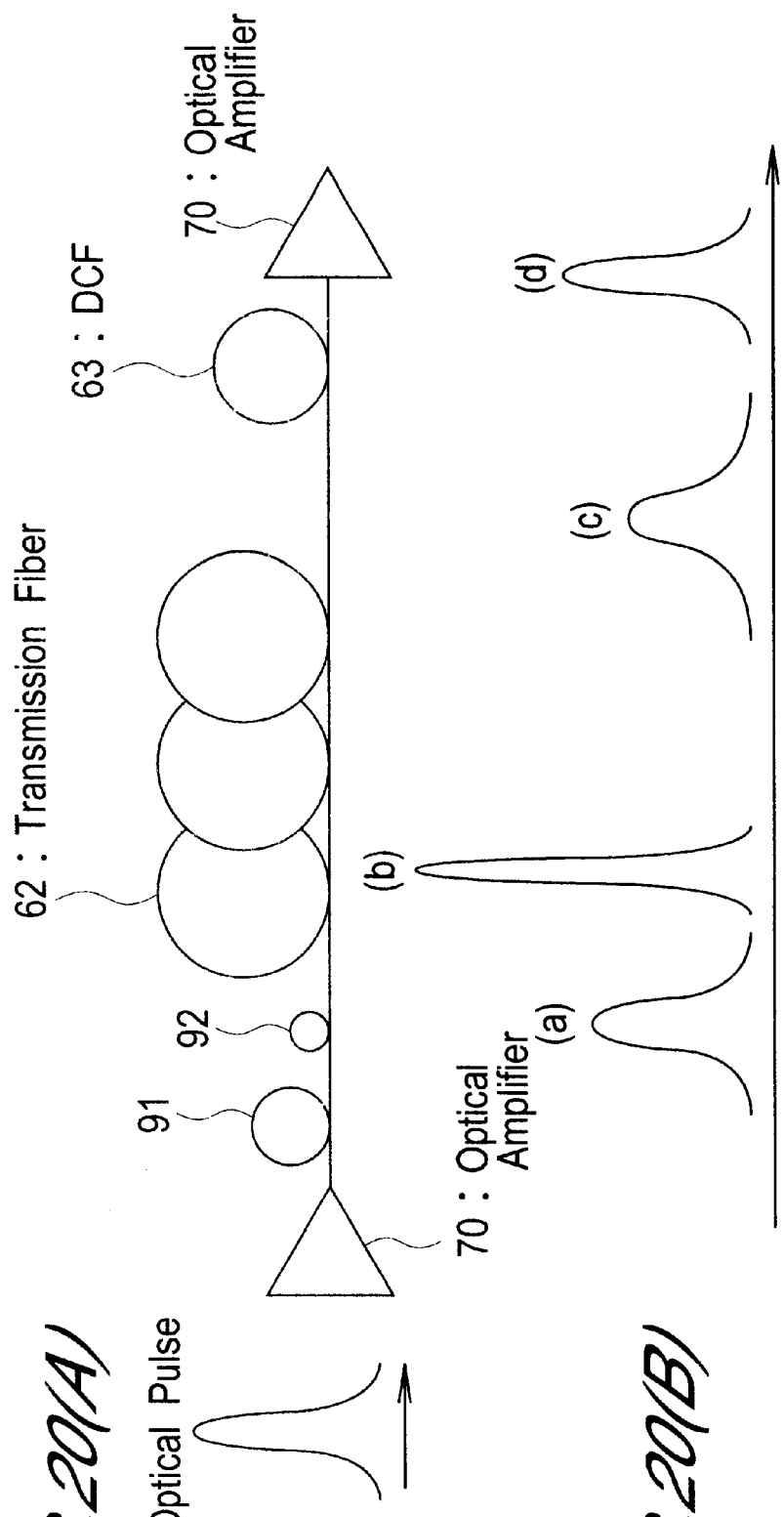
FIGS. 20(A) and (B) are a diagram depicting the condition of optical pulses in the optical transmission line according to the seventh embodiment of the present invention.

The state of an optical pulse according to the seventh embodiment is schematically shown in FIGS. 20(A) and (B). FIG. 20(A) depicts the same optical amplifier as that shown in FIG. 19(A). In the seventh embodiment, only slightly up-chirped pulses are used as the optical pulses inputted to the optical amplifier span in order to achieve more stable behavior. An optical pulse inputted to the optical amplifier span develops a nonlinear chirp (resulting from self-phase modulation) when propagating through the fiber 91 and fiber 92. At this time, the residual dispersion of the group made up of the fiber 91 and fiber 92 is zero. Locally, however, some dispersion remains, so the optical pulse outputted by the group made up of the fiber 91 and fiber 92 (an optical pulse (a) as shown in FIG. 20(B)) is a waveform only slightly different from the inputted optical pulse and having both a chirp produced by self-phase modulation and a preexisting blue chirp (pre-chirp).

When the optical pulse ((a) as shown in FIG. 20(B)) is subsequently admitted into the transmission fiber 62, compression overcomes the effect of dispersion (an optical pulse (b) as shown in FIG. 20(B)). This compression also includes the effect of the self-phase modulation in the transmission fiber 62. As the optical pulse propagates through the transmission fiber 62, losses increase and intensity decreases. Under these conditions, the effect of anomalous dispersion demonstrated by the transmission fiber 62 finally appears in the optical pulse, and the width of the optical pulse increases (an optical pulse (c) as shown in FIG. 20(B)).

The increase in width is linear, so linear compression occurs in the DCF 63 when the optical pulse then enters the subsequent DCF 63. As a result, the condition of the inputted optical pulse is substantially reproduced in the outlet portion of the DCF 63 (an optical pulse (d) as shown in FIG. 20(B)). The pulse is finally inputted to, and amplified by, another optical amplifier 70.

By repeatedly connecting such optical amplifier spans to form an optical transmission line, it is possible to generate soliton-type pulses of low chirp and waveform variation from the original optical pulses at the output of each optical amplifier. As a result, the optical pulses can propagate in a stable manner.

This embodiment allows the pre-chirp amount of an optical pulse inputted to an optical transmission line, or the power of an optical pulse transmitted inside a transmission line 62 to be set with a greater degree of freedom by varying the amount of dispersion or the length of the fiber 91 and fiber 92. In addition, the present embodiment entails using a group of two fibers as the dispersion compensation means disposed in front of the transmission fiber, making it possible to design an optical transmission line that has higher tolerance for the power of optical pulses, the amount of chirp, and the like.

FIG. 21 depicts an optical transmission line according to an eighth embodiment of the present invention. FIG. 21 depicts a single optical amplifier span in the same manner as in FIG. 19(A). The optical transmission line of the eighth embodiment has the same basic structure as that of the seventh embodiment. The eighth embodiment is different in that a variable optical attenuator 93 is further disposed immediately in front of the transmission fiber 62.

The variable optical attenuator 93 lowers the intensity of the optical pulse introduced into the transmission fiber 62. The waveform of the optical pulse transmitted by the variable optical attenuator 93 remains unchanged as such. No description will be given concerning the dispersion map because the optical amplifier span depicted in FIG. 21 is the same as that in the seventh embodiment except for the introduction of the variable optical attenuator 93. Specifically, FIG. 21 is a diagram depicting a single optical amplifier span.

The state of an optical pulse according to the eighth embodiment is substantially the same as in the seventh embodiment depicted in FIG. 20. Specifically, an optical pulse inputted to the optical amplifier span develops a nonlinear chirp (resulting from self-phase modulation) when propagating through the fiber 91 and fiber 92. The optical pulse outputted by the group made up of the fiber 91 and fiber 92 (see (a) as shown in FIG. 20(B)) is a waveform only slightly different from the inputted optical pulse and having both a chirp produced by self-phase modulation and a preexisting blue chirp (pre-chirp).

The optical intensity of the optical pulse (see (a) as shown in FIG. 20(B)) is subsequently lowered by the optical attenuator 93, and the pulse is admitted into the transmission fiber 62. Compression of the optical pulse overcomes the effect of dispersion therein (see (b) as shown in FIG. 20(B)). If the optical intensity can be successfully controlled at this time by the optical attenuator 93, the nonlinearity of the transmission fiber 62 can also be suppressed. The effect of self-phase modulation in the transmission fiber 62 can be reduced as a result.

The optical pulse widens as a result of anomalous dispersion in the same manner as in the seventh embodiment (see (c) as shown in FIG. 20(B)). The condition of the inputted optical pulse is then substantially reproduced by a procedure in which the optical pulse is inputted to the DCF 63 and is linearly compressed (see (d) as shown in FIG. 20(B)).

As noted above, a distinctive feature of the eighth embodiment is that a variable optical attenuator 93 is disposed immediately in front of the transmission fiber 62. The optical pulse whose optical intensity is reduced by the variable optical attenuator 93 suppresses the effect of self-phase modulation in the transmission fiber 62. As a result, nonlinearity-induced interaction is reduced even when pulse widening is produced by anomalous dispersion and adjacent pulses are superposed.

It is proven herein with reference to the seventh embodiment (see FIG. 21) that a very small amount of pre-chirp is provided to optical pulses even when there is no nonlinearity in the transmission fiber, and that soliton-type propagation virtually devoid of variations in the pulse shape can be achieved by utilizing the effect of self-phase modulation in frontally placed fibers 91 and 92. It is thus apparent that the same propagation as that afforded by the seventh embodiment can be achieved in the eighth embodiment when optical intensity is reduced by the optical attenuator 93.

Figure 22:
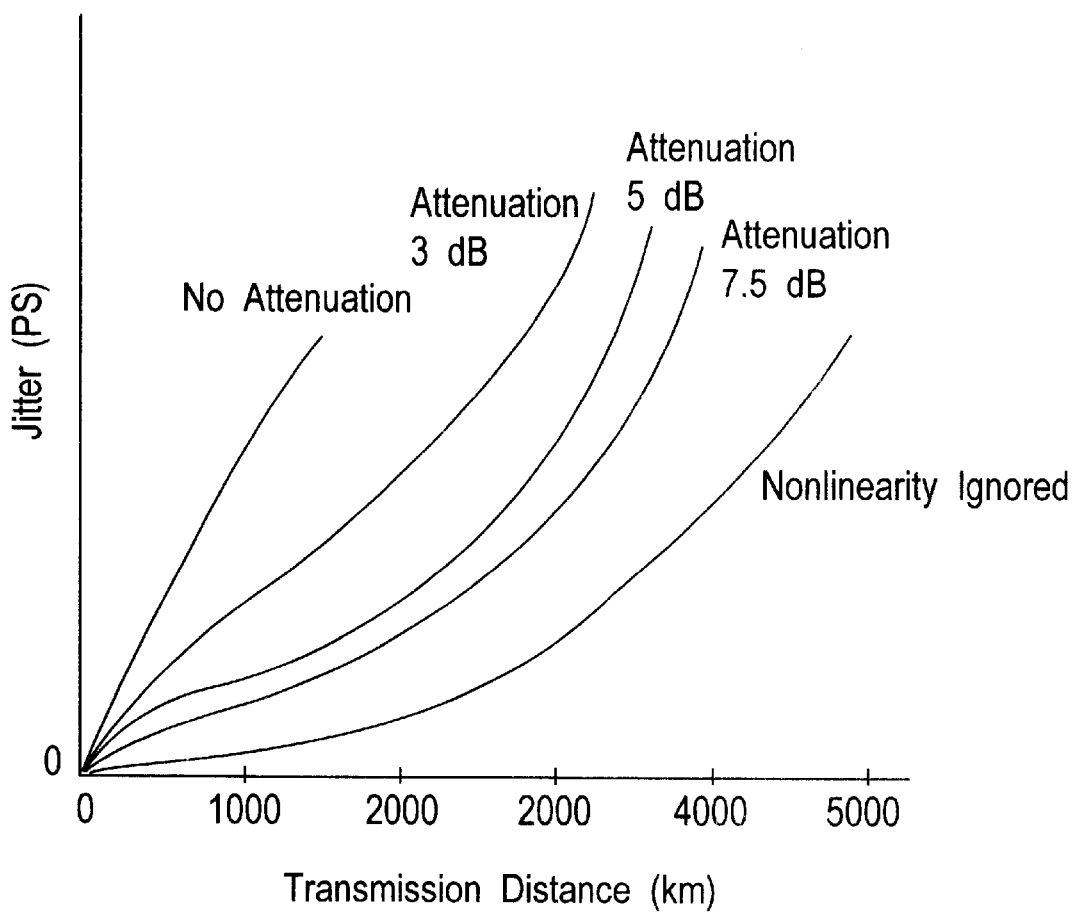
FIG. 22 is a diagram depicting time jitter variations according to the eighth embodiment of the present invention.

FIG. 22 depicts the results of calculating the extent to which time jitter is reduced by pulse interaction due to the nonlinearity of the transmission fiber 62 with variable attenuation in the optical attenuator 93. The results shown in FIG. 22 were obtained on the assumption that the bit rate of a signal sequence is 40 Gbit/s and that a Gauss shape with a full width at half maximum of 7.5 ps is used as the input optical pulse. For comparison purposes, FIG. 22 also shows a case in which the nonlinearity of the transmission fiber is completely ignored.

The results indicate that the cumulative time jitter that accompanies propagation decreases and a condition approaching that in which nonlinearity can be ignored is obtained as the attenuation in the optical attenuator 93 increases from 3 to 5 to 7.5 dB. Another distinctive property of the eighth embodiment is that the amount of pre-chirp and the optimum optical intensity can be reduced due to the suppressed effect of excess self-phase modulation in the transmission fiber 62.

As noted above, it is possible to obtain a highly reliable NRZ/RZ converter that has a simple structure and is designed to convert optical NRZ signals to optical RZ signals or soliton signals. It is also possible to realize an optical transmission line that allows the optical pulses thus generated to propagate in a stable manner.

What is claimed is:

1. An optical signal generation circuit comprising:
    an input port for receiving an optical NRZ signal;
    an optical coupler for splitting the optical NRZ signal into a first portion and a second portion;
    a clock extraction circuit for extracting a clock component from the first portion of the split optical NRZ signal; and
    an EA modulator designed to admit the second portion of the split optical NRZ signal, said EA modulator being energized by the clock component.

2. An optical signal generation circuit comprising:
    an input port for receiving an optical NRZ signal;
    an optical coupler for splitting the optical NRZ signal into a first portion and a second portion;
    a clock extraction circuit for extracting a clock component from the first portion of the split optical NRZ signal;
    a delay circuit for delaying the second portion of the split optical NRZ signal, and
    an EA modulator connected to the output of said delay circuit, said EA modulator being energized by the clock component.

3. An optical signal generation circuit as defined in claim 2, further comprising a level control circuit for receiving part of a light output of said EA modulator, said level control circuit being operable to control the delay of said delay circuit in accordance with variations in the light output of said EA modulator.

* * * * *